United States Patent
Kim et al.

(10) Patent No.: US 10,403,241 B2
(45) Date of Patent: Sep. 3, 2019

(54) ELECTRONIC DEVICE AND METHOD FOR RUNNING FUNCTION ACCORDING TO TRANSFORMATION OF DISPLAY OF ELECTRONIC DEVICE

(71) Applicant: Samsung Electronics Co., Ltd., Suwon-si, Gyeonggi-do (KR)

(72) Inventors: Hee-Jin Kim, Seoul (KR); Kyu-Ok Choi, Seoul (KR); Dong-Jun Shin, Seoul (KR); Chul-Woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 15/415,175

(22) Filed: Jan. 25, 2017

(65) Prior Publication Data
US 2017/0221456 A1    Aug. 3, 2017

(30) Foreign Application Priority Data
Jan. 29, 2016    (KR) .................. 10-2016-0011745

(51) Int. Cl.
*G06F 1/16* (2006.01)
*G09G 5/38* (2006.01)
(Continued)

(52) U.S. Cl.
CPC ............. *G09G 5/38* (2013.01); *G06F 1/1615* (2013.01); *G06F 1/1652* (2013.01); *G06F 3/013* (2013.01); *G06F 3/0346* (2013.01); *G06F 3/041* (2013.01); *G06F 3/0487* (2013.01); *G06F 3/0488* (2013.01); *G09G 3/20* (2013.01); *H04M 1/0268* (2013.01); *H04M 1/72519* (2013.01); *G06F 2200/1614* (2013.01); *G06F 2200/1637* (2013.01); *G06F 2203/04803* (2013.01);
(Continued)

(58) Field of Classification Search
CPC .......................... G09G 5/38; G06T 2219/2016
See application file for complete search history.

(56) References Cited

U.S. PATENT DOCUMENTS
2010/0225578 A1    9/2010 Ko
2013/0082902 A1    4/2013 Zhou
(Continued)

FOREIGN PATENT DOCUMENTS
KR    10-2015-0125554 A    11/2015

*Primary Examiner* — Phi Hoang
(74) *Attorney, Agent, or Firm* — Jefferson IP Law, LLP

(57) ABSTRACT

An electronic device is provided. The electronic device includes a display positioned on at least a surface of a housing of the electronic device, at least one sensor configured to sense a bend of the display and a mount of the electronic device, and a processor configured to control a running of an application, obtain information relating to a shape of the bend of the display and a form of the mount of the electronic device based on information sensed by the at least one sensor, determine a transformation type of the display based on the information relating to the shape of the bend and the form of the mount, when the electronic device is mounted in the determined transformation type, determine at least one display area in the display according to a first function of the application corresponding to the transformation type, and perform control to display an object relating to the first function on the determined display area.

18 Claims, 18 Drawing Sheets

(51) Int. Cl.
  *G06F 3/01* (2006.01)
  *G06F 3/0346* (2013.01)
  *G06F 3/041* (2006.01)
  *G09G 3/20* (2006.01)
  *G06F 3/0487* (2013.01)
  *H04M 1/725* (2006.01)
  *G06F 3/0488* (2013.01)
  *H04M 1/02* (2006.01)

(52) U.S. Cl.
  CPC . *G09G 2340/0492* (2013.01); *G09G 2380/02* (2013.01); *G09G 2380/14* (2013.01)

(56) References Cited

U.S. PATENT DOCUMENTS

| | | |
|---|---|---|
| 2013/0187879 A1* | 7/2013 | Koga ............ G06F 3/016 345/173 |
| 2013/0265221 A1 | 10/2013 | Lee et al. |
| 2014/0029017 A1 | 1/2014 | Lee et al. |
| 2015/0022472 A1 | 1/2015 | Jung et al. |
| 2015/0042674 A1 | 2/2015 | Lin |
| 2015/0160840 A1 | 6/2015 | Cho et al. |
| 2015/0185787 A1 | 7/2015 | Choi et al. |
| 2015/0222741 A1* | 8/2015 | Kim ............ H04M 1/72555 455/414.1 |

\* cited by examiner

| TYPE OF MOUNT | DIRECTION OF BEND | CONTACT SENSOR | GRAVITY SENSOR 1 | REFERENCE FOR DETERMINING WHETHER MOUNTED OR NOT ||| MAIN DISPLAY |
|---|---|---|---|---|---|---|---|
| | | | | GRAVITY SENSOR 2 | CAMERA | | |
| B-1 | BACKWARD | NON-CONTACT | CONTACT | | | | 1 |
| B-2 | BACKWARD | CONTACT | CONTACT | | | | 1 |
| S-1 | FORWARD | CONTACT SENSE END-TO-END DISTANCE 0 USING PROXIMITY SENSOR | CONTACT | | | | 3 |
| S-2 | FORWARD | CONTACT | CONTACT | O (DIVIDE BY GRAVITY SENSOR) | | | 3 |
| S-3 | FORWARD | NON-CONTACT | CONTACT | | O (DIVIDE BY SENSING VIEW) | | 1,2 |
| F-1 | FORWARD | NON-CONTACT | CONTACT | | | NEITHER USER TOUCH NOR DEVICE MOVE DURING TIME T | 1,2 |
| F-2 | FORWARD | NON-CONTACT | NON-CONTACT | | | | |

FIG.7

ELECTRONIC DEVICE AND METHOD FOR RUNNING FUNCTION ACCORDING TO TRANSFORMATION OF DISPLAY OF ELECTRONIC DEVICE

CROSS-REFERENCE TO RELATED APPLICATION(S)

This application claims the benefit under 35 U.S.C. § 119(a) of a Korean patent application filed on Jan. 29, 2016 in the Korean Intellectual Property Office and assigned Serial number 10-2016-0011745, the entire disclosure of which is hereby incorporated by reference.

TECHNICAL FIELD

The present disclosure relates to an electronic device and method for running functions according to the transformation of the display of an electronic device.

BACKGROUND

Electronic devices may include various types of displays capable of displaying objects for functions that run to provide information to users. Conventional displays for electronic devices typically come in flat display panels.

The growth of technology has advanced display technology, leading to the development of flexible displays that can bend or roll. Such transformable displays afford electronic devices better design flexibility and novel configurations, as well as more portability and usability, availing themselves of a chance of being adopted in various technological sectors.

Electronic devices of the related art with a transformable display allow the users easy-to-use angles or positions upon running functions, but do not for transformation to fit the context or intent of use.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for identifying the type of transformation in which the electronic device transforms so that the display bends under the circumstance where an application is running and performing functions of the application depending on the identified transformation type.

In accordance with an aspect of the present disclosure, an electronic device is provided. The electronic device includes a display positioned on at least a surface of a housing of the electronic device, at least one sensor configured to sense a bend of the display and a mount of the electronic device, and a processor configured to control a running of an application, obtain information relating to a shape of the bend of the display and a form of the mount of the electronic device based on information sensed by the at least one sensor, determine a transformation type of the display based on the information relating to the shape of the bend and the form of the mount, when the electronic device is mounted in the determined transformation type, determine at least one display area in the display according to a first function of the application corresponding to the transformation type, and perform control to display an object relating to the first function on the determined display area.

In accordance with another aspect of the present disclosure, a method for running a function on an electronic device is provided. The method includes running an application, obtaining information relating to a shape of a bend of a display and a form of a mount of the electronic device based on information sensed by at least one sensor, determining a transformation type of the display based on the information relating to the shape of the bend and the form of the mount, when the electronic device is mounted in the determined transformation type, determining a display area in the display according to a first function of the application corresponding to the transformation type of the display, and displaying an object relating to the first function on the determined display area.

An application may be run appropriately for the context of use or the intent of the transformation type as the housing or display of the electronic device transforms, providing for an intuitive and familiar user experience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a view illustrating conditions for detecting the transformation of a display of an electronic device according to an embodiment of the present disclosure;

Throughout the drawings, like reference numerals will be understood to refer to like parts, components, and structures.

DETAILED DESCRIPTION

Figure 1:
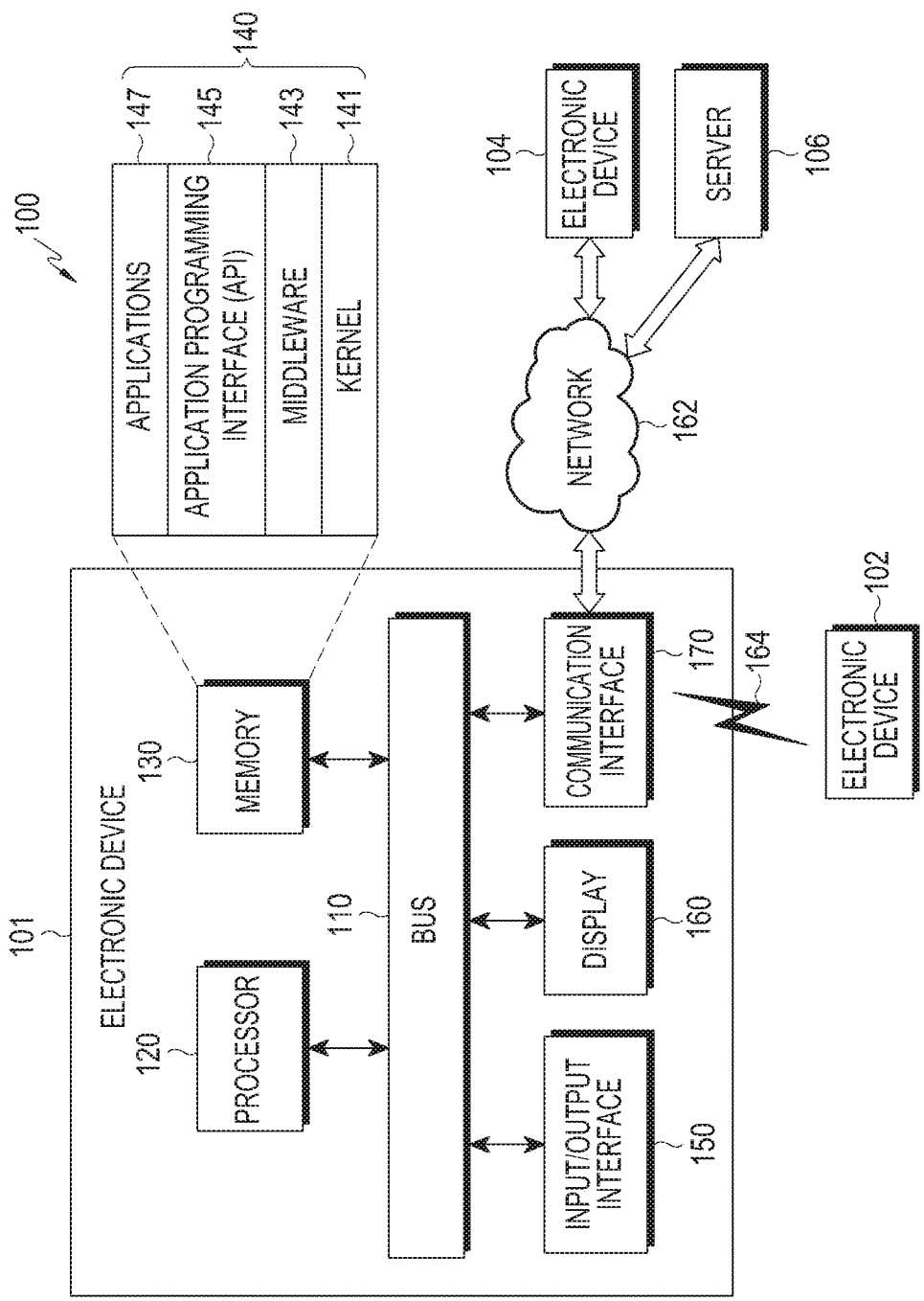
FIG. 1 is a view illustrating a network configuration according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other various embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude various embodiments of the present disclosure.

For example, examples of the electronic device according to various embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television (TV), a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a view illustrating a network configuration according to an embodiment of the present disclosure.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a CPU, an AP, or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may use at least one of, e.g., long term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), Bluetooth, near-field communication (NFC), Zigbee, Z-wave, or GNSS. The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Various embodiments of the present disclosure are now described with reference to the accompanying drawings.

Figure 2:
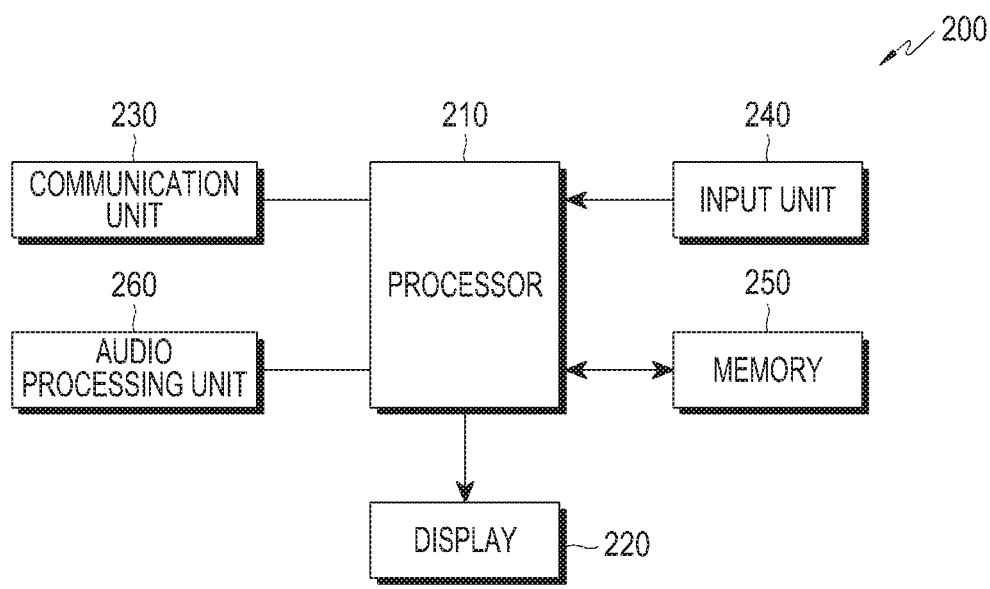
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, according to an embodiment of the present disclosure, an electronic device 200 (e.g., the electronic device 101 of FIG. 1) may include at least one of a processor 210, a display 220, a communication unit 230, an input unit 240, a memory 250, or an audio processing unit 260.

According to an embodiment of the present disclosure, the processor 210 (which is the same or similar to, e.g., the processor 120 of FIG. 1) may control the running of a function, application, program, or information according to the operation of the electronic device. The processor 210 may perform control to communicate with peripheral devices and may perform control to display various types of information (e.g., graphic elements, contents, or objects) on the whole or part of the screen of the display 220.

Further, the processor 210 may check the use context of the electronic device. Here, the use context of the electronic device relates to the current operation context of the electronic device. The user context of the electronic device may mean the running of a program, application, or function of the electronic device. Hereinafter, the running of functions of the electronic device is described in regard to the use context of the electronic device, for example.

When a particular function of the electronic device 200 runs, the processor 210 may identify whether the electronic device 200 transforms, switch into a use mode corresponding to the function currently running according to the type of the transformation, and run the function in the switched use mode. As the electronic device 200 transforms, the display panel in the display 220 also bends to the changed shape. Thus, the processor 210 may obtain information relating to the bent shape according to the transformation of the display 220 using at least one of the direction bent, rotation angle, resistance, and inter-gravity sensor distance of the display 220. The processor 210 may obtain information relating to the type in which the electronic device 200 is positioned using at least one sensor (e.g., a contact sensor, camera sensor, gravity sensor, or a slope sensor). The processor 210 may determine the type of transformation according to the shape of the electronic device 200, i.e., the changed shape of the display 220, based on the information relating to the bent shape of the display 220 and the information relating to the type of the position.

The processor 210 may determine at least one display area to be used according to the switched use mode (e.g., an application function) in the display 220 bent by the transformation of the electronic device 200 and perform control to display an object relating to a function to run in the switched use mode on the, at least one, display area determined. Where multiple display areas are determined, the processor 210 may determine a main display area. When sensing the bending of the display 220, the processor 210 may divide the screen of the display panel in the display 220 according to the type of transformation, which is determined based on the bent shape and the type of position, and set at least one or more display areas to be used among the divided screen areas.

Further, the processor 210 may identify whether the electronic device 200 is positioned in the type of transformation. Here, when there is no move of the electronic device 200 or no user input (e.g., a touch input) for a preset time, the processor 210 may determine that the electronic device 200 is positioned in the determined type of transformation. When the electronic device 200 is determined to be positioned in the type of transformation, the processor 210 may run a proper function according to the switched use mode corresponding to the changed shape.

According to an embodiment of the present disclosure, the processor 210, which may be a hardware module or software module (e.g., an application program), may be a hardware component (function) or software component (program) including at least one of various sensors, data measuring module, input/output interface, a module for managing the state or environment of the electronic device 200, or communication module as included in the electronic device 200.

Further, the processor 210 may be at least a portion of the processor and may include a combination of one or more of, e.g., hardware, software, or firmware. The processor 210 may lack at least some of the components or may include other components for performing the function of the electronic device in addition to the components.

According to an embodiment of the present disclosure, when implemented in hardware, the configuration of at least a portion of the processor 210 of the electronic device 200 may include some of at least one processor including a CPU/micro processing unit (MPU), a memory (e.g., a register and/or random access memory (RAM)) where at least one piece of memory loading data is loaded, and a bus for inputting/outputting at least one piece of data to the processor and memory. When implemented in software, the processor 210 may include a predetermined program routine or program data that is loaded from a predetermined recording medium to a memory to perform a defined function on the electronic device and is processed by the processor.

According to an embodiment of the present disclosure, the display 220 (e.g., a partial configuration of the input/output interface 150 or display 160 of FIG. 1) of the electronic device may output information relating to a result of running an operation (e.g., at least one object or graphic element of text, image, or video) under the control of the processor 210.

The display 220 may display, on the screen, an input pad (e.g., a button) for entering at least one of various numbers, characters, or symbols on an input window, in various manners. The display 220 may display a screen of running a service according to the execution of various applications related to information communication.

Further, the display 220 may be configured with a bendable display panel (e.g., a flexible display). For example, a foldable technique may apply to the display 220, allowing the display panel in the electronic device 200 to fold or unfold as the electronic device 200 folds or unfolds.

According to an embodiment of the present disclosure, the display 220 may have display panels respectively formed on the respective predetermined areas of the front and back surface of the housing of the electronic device 200. According to an embodiment of the present disclosure, the display 220 may include a display panel allowing objects to be displayed on both the front and back surface.

Further, upon sensing a bend, the display 220 may be divided into screen areas of the display panel according to the type of the bend, and at least one or more display areas for use may be set among the divided screen areas.

Further, when the display 220 is implemented in the form of a touchscreen, the display 220 may correspond to the touchscreen of the input unit 240. The display 220, when implemented together with the input unit 240 in the form of a touchscreen, may display various information generated according to the user's touch operation.

According to an embodiment of the present disclosure, the display 220 of the electronic device may include at least one or more of a LCD, a thin film transistor LCD (TFT-LCD), an OLED display, a LED display, an active matrix OLED (AMOLED) display, a flexible display, and a three-dimensional (3D) display. Some of the displays may be configured in a transparent type or light-transmissive type allowing the outside to be viewed therethrough. This may be configured in the form of a transparent display including a transparent OLED (TOLED) display.

According to an embodiment of the present disclosure, the electronic device 200 may further include, in addition to the display 220, another display unit (e.g., an expanded display unit or flexible display unit) or a display unit of an external electronic device (e.g., at least one of an external electronic device, a wearable device, or an external terminal device) interworking with the electronic device.

According to an embodiment of the present disclosure, the communication unit 230 (e.g., the communication interface 170 of FIG. 1) of the electronic device may perform communication with other electronic device or external electronic device (e.g., the electronic device 102 or 104 of FIG. 1) under the control of the processor 210. According to an embodiment of the present disclosure, the communication unit 230 may communicate data related to an operation run under the control of the processor 210 with an external device. The communication unit 230 may connect to a network through wireless communication or wired communication via the communication interface or perform communication through inter-device connection. The wireless connection may be made by various radio communication protocols, including, but not limited to, Wi-Fi, Bluetooth (BT), Zigbee, Z-wave, NFC, GPS, or cellular communication protocols (e.g., LTE, LTE-A, CDMA, WCDMA, UMTS, WiBro or GSM). The wired communication may include at least one of, e.g., USB, HDMI, RS-232, POTS, universal asynchronous receiver transmitter (UART), inter-integrated circuit (I2C), serial peripheral interface (SPI), or controller area network (CAN). The communication unit 230 may include all other types of communication schemes that have been widely known or are to be developed in the future, in addition to the above-enumerated communication schemes.

According to an embodiment of the present disclosure, the input unit 240 (e.g., the input/output interface 150 of FIG. 1) of the electronic device may transfer, to the processor 210, various information, such as number and character information entered from the user and signals entered in relation with setting various functions and controlling functions by the electronic device. The input unit 240 may support a user input for running an application or module supporting a particular function. The input unit 240 may include at least one of a key input means, such as a keyboard or keypad, a touch input means, such as a touch sensor or touchpad, a sound source input means, an image capturing means, or various sensors, and the input unit 230 may include a gesture input means. Further, the input unit 240 may include all types of input means that are being currently in development or are to be developed in the future. According to an embodiment of the present disclosure, the input unit 240 may receive, from the user, information entered by the user through the touch panel of the display 220 and may transfer the received information to the processor 210.

According to an embodiment of the present disclosure, the input unit 240 may transfer, to the processor 210, information related to the user's gesture received through various sensors. The input unit 240 may transfer, to the processor 210, an input signal according to the selection of at least one object (e.g., a content) displayed on the screen.

Further, according to an embodiment of the present disclosure, the input unit 240 may receive an input signal for switching modes from the user through the sound source input means and transfer the received signal to the processor 210. Further, the input unit 240 may receive a signal, sensed as the electronic device 200 transforms, through various sensors (e.g., a touch sensor, contact sensor, gravity sensor, camera sensor, or slope sensor) and transfer the received signal to the processor 210.

According to an embodiment of the present disclosure, the memory 250 (which is the same or similar to, e.g., the memory 130 of FIG. 1) of the electronic device may store various data generated while the program runs, as well as a program necessary for a functional operation according to an embodiment. The memory 250 may largely include a program area and a data area. The program area may store relevant information for driving the electronic device, such as OS for booting up the electronic device. The data area may store data communicated and generated according to an embodiment of the present disclosure. Further, the memory 250 may include at least one storage medium of a flash memory, a hard disk, a multimedia card, a micro-type memory (e.g., a secure digital (SD) or an extreme digital (xD) memory), a RAM, or a read only memory (ROM).

According to an embodiment of the present disclosure, the memory 250 may store, e.g., information relating to applications run on the electronic device 200, information relating to a function of an application set corresponding to the bent shape of the display 220, and information relating to a display area set according to the changed shape of the display 220 bent as the electronic device 200 transforms.

According to an embodiment of the present disclosure, the electronic device may include an audio processing unit 260 (e.g., the input/output interface 150 of FIG. 1). The audio processing unit 260 may output sounds and may include at least one of, e.g., an audio codec, a microphone (MIC), a receiver, an earphone output (EAR_L) or a speaker. According to an embodiment of the present disclosure, the audio processing unit 260 may output audio information generated according to the current running of an application and may output the audio information in a mute mode, speaker mode, or earphone mode according to each function of the running application. Further, when the application runs in a function corresponding to the transformed type of the display 220, the audio processing unit 260 may output audio information relating to the running function. For example, when the function corresponding to the current type of transformation of the display 220 is a speaker function, the audio processing unit 260 may operate the speaker so that the audio information is outputted through the speaker under the control of the processor 210. Where the audio processing unit 260 used to run in the speaker function runs in the earphone or mute mode corresponding to the type of transformation, the audio processing unit 260 may cut off or reduce the audio output through the speaker or may output the audio signal through the earphone.

Further, according to an embodiment of the present disclosure, the electronic device may further include a means to output vibrations or a means to emit smells. When each running application runs in a function corresponding to the transformed type of the display 220, the vibration output means or smell output means may output information relating to the running function as a vibration or smell.

Main components of the electronic device have been described above with reference to FIG. 2, according to an embodiment of the present disclosure. However, the components shown in FIG. 2 are not essential components, and the electronic device may be implemented with more or less components than those shown. The position of the major components described above in connection with FIG. 2 may be varied according to various embodiments of the present disclosure.

Figure 3:
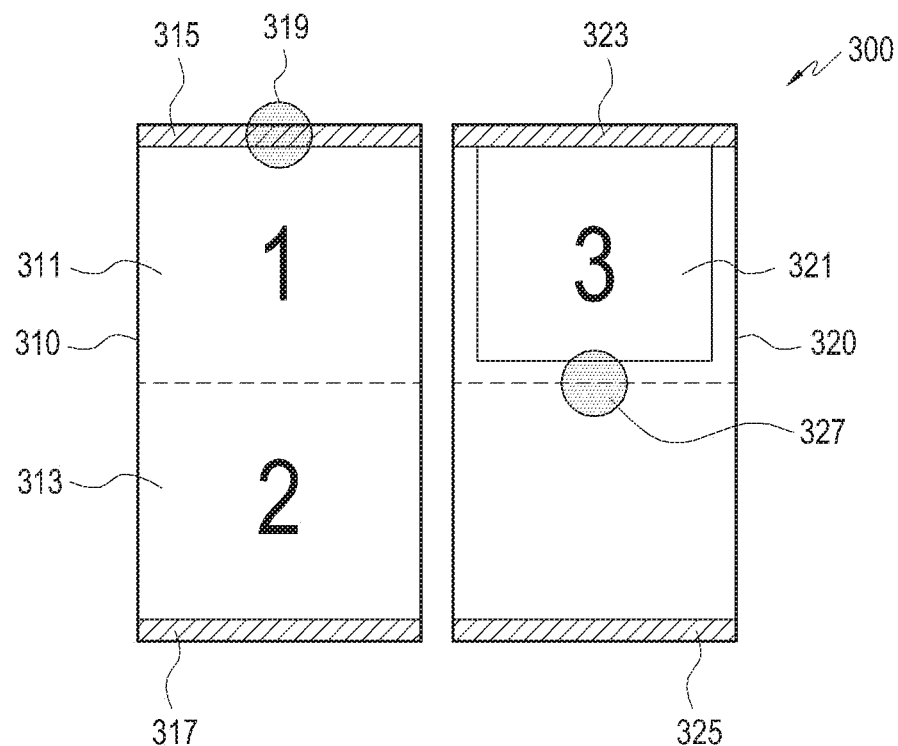
FIG. 3 is a view illustrating a configuration of a display of an electronic device according to an embodiment of the present disclosure.

FIG. 3 is a view illustrating a configuration of a display of an electronic device according to an embodiment of the present disclosure.

Referring to FIG. 3, the electronic device 300 (e.g., the electronic device 101 of FIG. 1 or the electronic device 200 of FIG. 2) may include sensors 315 and 317 (e.g., an illumination sensor or touch sensor) for sensing whether an upper portion and lower portion of a first display 310 formed on a first surface (e.g., an inner surface) of the housing are brought in contact with a floor. When the electronic device 300 is bent along the dotted line, the screen of the first display 310 may be divided into a first display area 311 and a second display area 313. A camera module 319 may be disposed in a housing area adjacent to the first display area 311 of the display 310. Further, the electronic device 300 may include a second display 320 on a second surface (e.g., an outer surface) of the housing, which is an opposite surface of the first surface. A camera module 327 may be disposed in an area of the housing adjacent to a display 321. Sensors 323 and 325 (e.g., an illumination sensor or touch sensor) for sensing a contact to the floor as the electronic device 300 is positioned may be disposed at an upper and lower portion, respectively, of the second surface.

The electronic device described above with reference to FIG. 3 may include one of the first display 310 or the second display 320 or may further include other display(s). Further, the sensors 315 and 317 or sensors 323 and 325 for sensing a contact to the floor may be disposed at other positions of the housing of the electronic device. The camera module 319 or 327 may be disposed at a different position of the housing of the electronic device.

Figure 4:
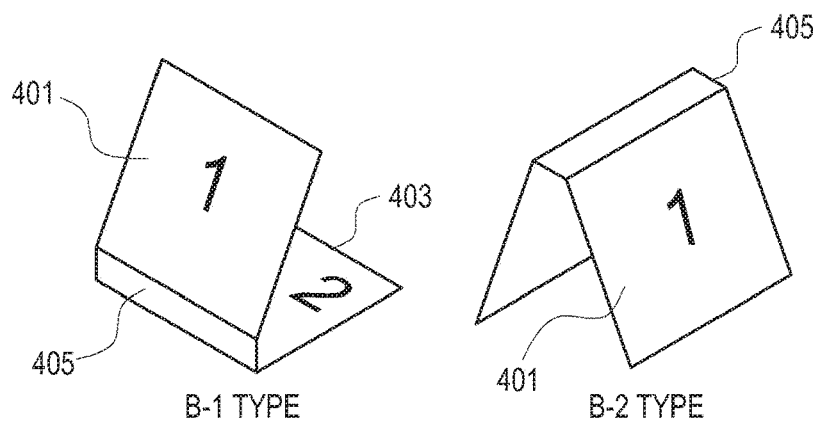
FIGS. 4 to 6 are views illustrating the transformation of a display of an electronic device according to various embodiments of the present disclosure.
Figure 5:
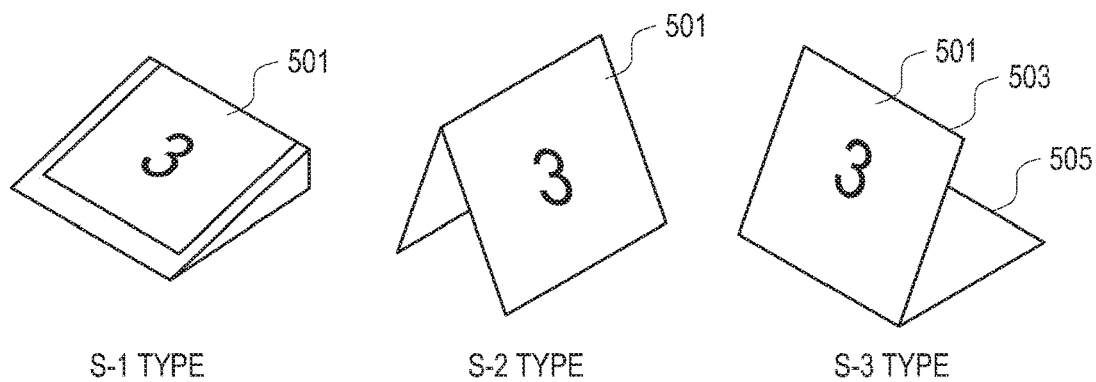
Figure 6:
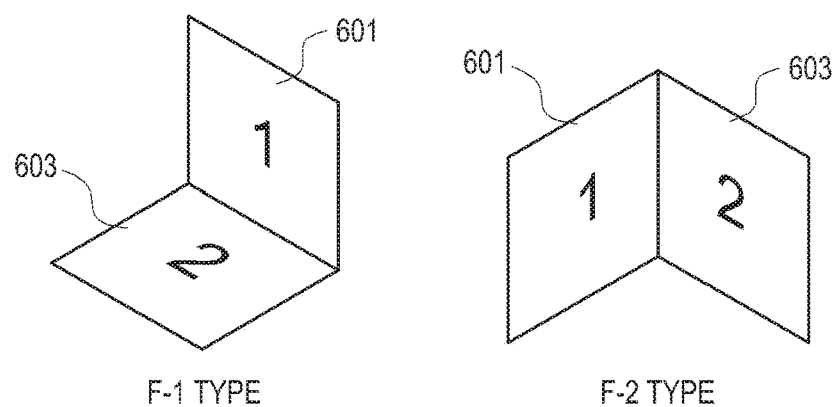

FIGS. 4 to 6 are views illustrating examples of the transformation of a display of an electronic device according to various embodiments of the present disclosure.

According to an embodiment of the present disclosure, the electronic device (the electronic device 101 of FIG. 1 or the electronic device 200 of FIG. 2) may determine a transformation type according to the transformation of the electronic device or the display included in the electronic device. The electronic device or the display in the electronic device may be transformed in various transformation types (e.g., B-1, B-2, S-1, S-2, S-3, F-1, or F2), as shown in FIGS. 4 to 6, by the user's manipulation according to use intentions or purposes. According to such transformation, the processor of the electronic device may obtain information relating to the bent shape and information relating to the type of position based on a signal obtained by, e.g., at least one sensor and determine the transformation type based on the obtained bent shape-related information and position type-related information. Further, according to an embodiment of the present disclosure, at least one display of the electronic device may be formed in tight contact with the first or second surface of the housing and in parallel with the first or second surface, as shown in FIG. 3, and may thus be bent and transformed corresponding to the form and direction in which the housing folds. Thus, at least one display configured thus may be transformed in the same form as the transformation of the electronic device. Further, the display may be formed so that the flexible display is expanded from the housing depending on various configurations of the electronic device in which case the display including the flexible panel is not transformed corresponding to the transformation of the housing of the electronic device but may separately be transformed in the transformation types as shown in FIGS. 4 to 6.

Further, the electronic device or the display in the electronic device may be transformed in various types without limited to those shown in FIGS. 4 to 6, and the use intention and purpose may be grasped depending on the transformation so that a proper function may be set. Accordingly, when the user transforms the electronic device or the display in the electronic device in a particular transformation type, the electronic device may run a function (e.g., a function of an application) corresponding to the particular transformation type.

Referring back to FIGS. 4 to 6, each transformation type is described in detail. Here, the transformation type may be the shape of the housing of the electronic device according to the transformation of the electronic device or the shape of the display of the electronic device according to the transformation of the display. Examples in which each transformation type is the shape of the display are now described. Described in the examples is a display in which display panels capable of displaying objects may be formed on the first surface and its opposite surface, i.e., the second surface, respectively, as shown in FIGS. 4 to 6. Here, the display panel on the first surface may be divided into a first display area, a second display area, and a fourth display area depending on, e.g., transformation types, and the display panel on the second surface may include, e.g., a third display area.

Referring to FIG. 4, the B-1 type and the B-2 type are types in which the first display area 401 and the second display area 403 divided with respect to a reference line for bending the display are bent in opposite directions of each other. In the B-1 type and the B-2 type, an intermediate area 405 (e.g., the fourth display area) may be formed between the first display area 401 and the second display area 403. In the B-1 type, the display may be positioned so that the first display area 401 faces up, and the inside second display area 403 faces the floor. In the B-2 type, the display may be positioned so that the fourth display area 405 faces up.

Referring to FIG. 5, the S-1 type, S-2 type, and S-3 type are types in which the first display area 503 and the second display area 505 divided with respect to a reference line for bending the display are bent in directions where they face each other, and the display is transformed so that the third display area 501 can be viewed by the user. In the S-1 type, the display may be positioned so that the third display area 501 faces up, and the back surface of the second display area 505 faces the floor. In the S-2 type, the display may be positioned so that the third display area 501 faces the user, and the fold line faces up.

Referring to FIG. 6, the F-1 type and F-2 type are types in which the first display area 601 and the second display area 603 divided with respect to a reference line for bending the display are bent in directions where they face each other, and the display is transformed so that the first display area 601 and the second display area 603 can be seen by the user. In the F-1 type, the display may be positioned so that the back surface of the second display area 603 contacts the floor, and the first display area 601 faces the user. In the F-2 type, the display may be positioned so that the first display area 601 and the second display area 603 both face the user.

FIG. 7 is a view illustrating conditions for detecting a transformation of a flexible display of an electronic device according to an embodiment of the present disclosure.

The electronic device (e.g., the electronic device 101 of FIG. 1, the electronic device 200 of FIG. 2, or the electronic device 300 of FIG. 3) may sense the transformation of the electronic device or display and determine the transformation type according to the conditions set as shown in FIG. 7. The electronic device may determine the transformation type based on information relating to the bent shape (e.g., direction, rotation angle, or resistance of the bend, or inter-gravity sensor distance) and information relating to the type of position (information about the area contacting the floor) obtained by at least one of a first contact sensor (e.g., the sensor 315 or 323 of FIG. 3), a second contact sensor (e.g., the sensor 317 or 325 of FIG. 3), a gravity sensor, or a camera sensor. Further, when the electronic device is determined to be in a mounted position, the electronic device the electronic device may determine the transformation type corresponding to the transformed shape. Here, when the processor of the electronic device determines that there is no touch by the user and no move of the electronic device during a predetermined time (t), the electronic device or the display may be determined to be in the mounted position. The electronic device may set a main display area per transformation type. For example, the first display area may be set as the main display area in the B-1 and B-2 type, the third display area may be set as the main display area in the S-1 to S-3 type, and the first and/or second display area may be set as the main display area in the F-1 and F-2 type. According to an embodiment of the present disclosure, upon sensing the user's view through the camera sensor when the electronic device is in the bent shape, the electronic device may determine that the display is in such a transformation type that the area where the camera module is equipped faces the user (e.g., the S-3 type or F-1 type). According to an embodiment of the present disclosure, the electronic device may set the main display area or run a particular function of the running application based on the direction in which the camera module or speaker faces when the electronic device is in the bent shape.

According to an embodiment of the present disclosure, an electronic device may comprise a display positioned on at least a surface of a housing of the electronic device, at least one sensor sensing a bend of the display and mount of the electronic device, and a processor controlling a running of an application. The processor may obtain information relating to a shape of the bend of the display and a form of the mount of the electronic device based on information sensed by the at least one sensor, determine a transformation type of the display based on the information relating to the shape of the bend and the form of the mount, when the electronic device is mounted in the determined transformation type, determine at least one display area in the display according to a first function of the application corresponding to the transformation type, and performs control to display an object relating to the first function on the determined display area.

According to an embodiment of the present disclosure, when no input information is received by a user or the electronic device does not move during a preset time, the processor may determine that the electronic device is in a state of being mounted in the determined transformation type.

According to an embodiment of the present disclosure, the processor may detect feature information for the transformation type and set the first function of the application based on the detected feature information.

According to an embodiment of the present disclosure, the processor may choose a main display area among the determined at least one display area and display the object relating to the first function on the chosen main display area.

According to an embodiment of the present disclosure, upon identifying the form of the mount of the electronic device based on the information relating to the form of the mount while the display remains in the shape of the bend, the processor may determine that the transformation type of the display is a transformation type set corresponding to the shape of the bend of the display and the identified form of the mount.

According to an embodiment of the present disclosure, the information relating to the shape of the bend of the display may include at least one of a direction, rotation angle, or resistance of the bend of the display, or an inter-gravity sensor distance. The information relating to the form of the mount may include at least one of information received from at least one sensor sensing whether there is a contact to a floor or information obtained by sensing a user's view received from a camera.

According to an embodiment of the present disclosure, when an event for another application occurs while the first function of the application runs with the electronic device mounted in the transformation type, the processor may perform control to display an object for a function of the other application corresponding to the current transformation type on the determined display area.

According to an embodiment of the present disclosure, when the display transforms from the transformation type to another transformation type, the processor may determine the other transformation type and display an object for a second function of the application on a display area chosen in the other transformation type while keeping running the application.

According to an embodiment of the present disclosure, the display area chosen in the other transformation type may be different from the display area displaying the object for the first function of the application in the previous transformation type.

An operational procedure for running an application in a function set corresponding to the transformation of the display in the above-described electronic device is described below in detail with reference to the accompanying drawings.

Figure 8:
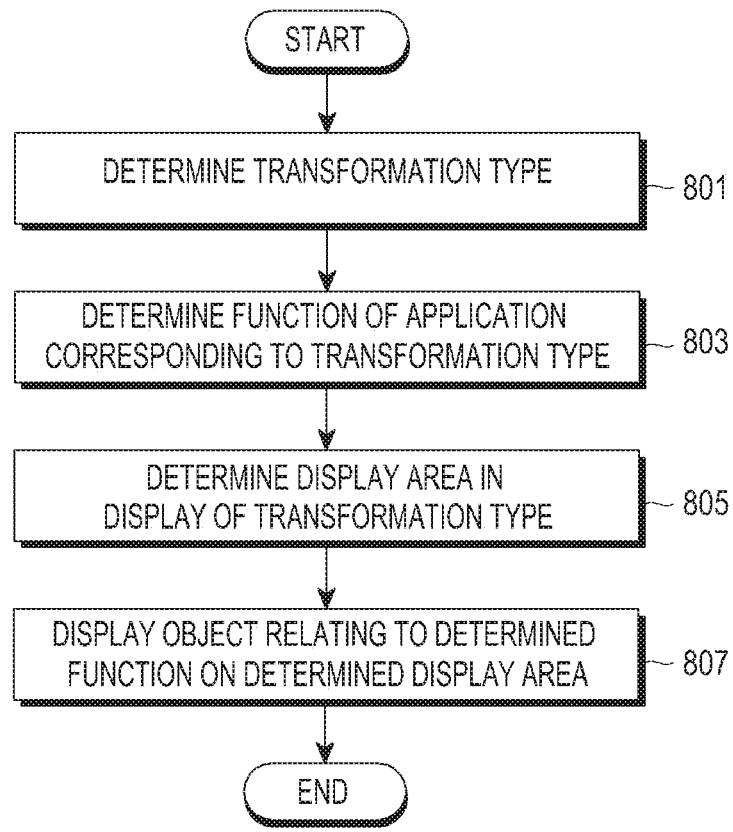
FIG. 8 is a view illustrating a procedure for operating an electronic device according to an embodiment of the present disclosure.

FIG. 8 is a view illustrating a procedure for operating an electronic device according to an embodiment of the present disclosure.

Referring to FIG. 8, according to an embodiment of the present disclosure, an electronic device (e.g., the electronic device 101 of FIG. 1 or the electronic device 200 of FIG. 2) may detect the transformation, by the user, of the housing or display of the electronic device, with an application running, and determine the type of the transformation in operation 801. Here, the electronic device may sense the transformation of the housing or display by a program or various sensors capable of identifying the transformation or mount of the housing or display. Further, the electronic device may determine the transformation type of the display based on information about results measured by the program (e.g., information relating to the bent and/or information relating to the form of the mount) or signals sensed by the sensors.

In operation 803, the electronic device may identify the function of the application corresponding to the determined transformation type. The electronic device may previously set a proper function for the application per transformation type, and upon detecting transformation, the electronic device may determine the function corresponding to the determined transformation type. Further, upon sensing the transformation, the electronic device may extract feature information about the transformation type and provide information about at least one function relating to the extracted feature information, e.g., a list or popup message containing information for identifying functions, to the user. Among at least function provided, the most appropriate function may be chosen by the user's selection or automatically depending on a condition previously set by the user. Here, the feature information may include at least one of information about, e.g., the position of the camera module, the position of the speaker, and whether the display area is the display formed on the inside (e.g., the first surface) or on the outside (e.g., the second surface) and information about the number of display areas into which the display is divided, and the direction and degree (e.g., angle) of the bend.

In operation 805, the electronic device may determine at least one display area according to the determined function in the display transformed in the transformation type. Here, the electronic device may choose a main display area among the at least one display area determined in order to display an object relating to the determined function.

The electronic device may run the determined function when the display is left mounted while remaining in the transformation type for a preset time. In operation 807, thus, the electronic device may display the object relating to the determined function on the determined display area. Further, when the main display area is chosen in operation 805, the electronic device may display the object relating to the determined function on the main display area. Further, the electronic device may display at least one of some objects relating to the determined function, an object relating to a function previously run, or an object relating to a major function that should be run as default on at least one determined display area other than the main display area.

FIGS. 9A, 9B, 10A, 10B, and 11 are views illustrating an example of detecting the transformation of a display of an electronic device according to an embodiment of the present disclosure.

Referring to FIGS. 9A, 9B, 10A, 10B, and 11, the electronic device may measure a bend of the display panel included in the display using various sensors.

Figures 9A, 9B:
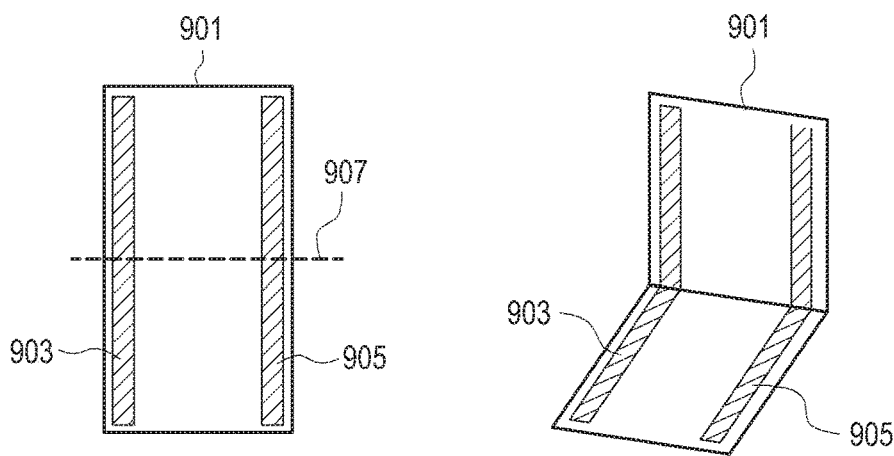
FIGS. 9A, 9B, 10A, 10B, and 11 are views illustrating an operation of detecting a transformation of a display of an electronic device according to various embodiments of the present disclosure.

As shown in FIGS. 9A and 9B, sensors (flex sensors) 903 and 905 may be formed on some areas (e.g., lengthwise areas respectively positioned adjacent to both ends of the bend) of the display 901 of the electronic device. Thus, the electronic device may identify the bend 907 of the display by measuring a variation in resistance of the display using the sensors 903 and 905 formed on the display panel.

Figures 10A, 10B:
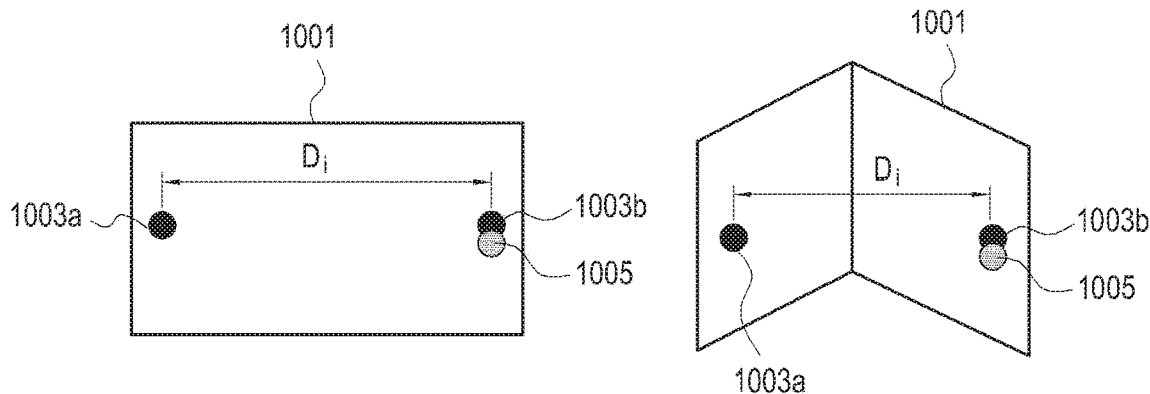

Further, referring to FIGS. 10A and 10B, the direction and degree of the bend of the display 1001 of the electronic device may be measured based on the distance Di between gravity sensors 1003a and 1003b or a proximity sensor 1005. For example, when the distance D1 between the gravity sensors is a preset threshold D0 or less, the display may be determined to be bent, or when the distance D1 is the threshold D0 or more, the display may be determined to be outspread. Further, the electronic device may calculate the degree of the bend according to the difference between the two values.

Figure 11:
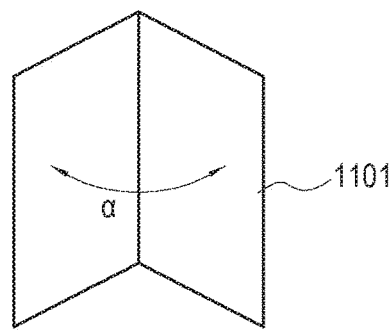

Referring to FIG. 11, the electronic device may detect the angle αi of the pivot on the axis of the bend of the display 1101, and when the detected pivot angle is a threshold angle α0, the electronic device may determine that the display 1101 is bent. Here, the pivot angle in the outspread position may be 180 degrees.

Figure 12:
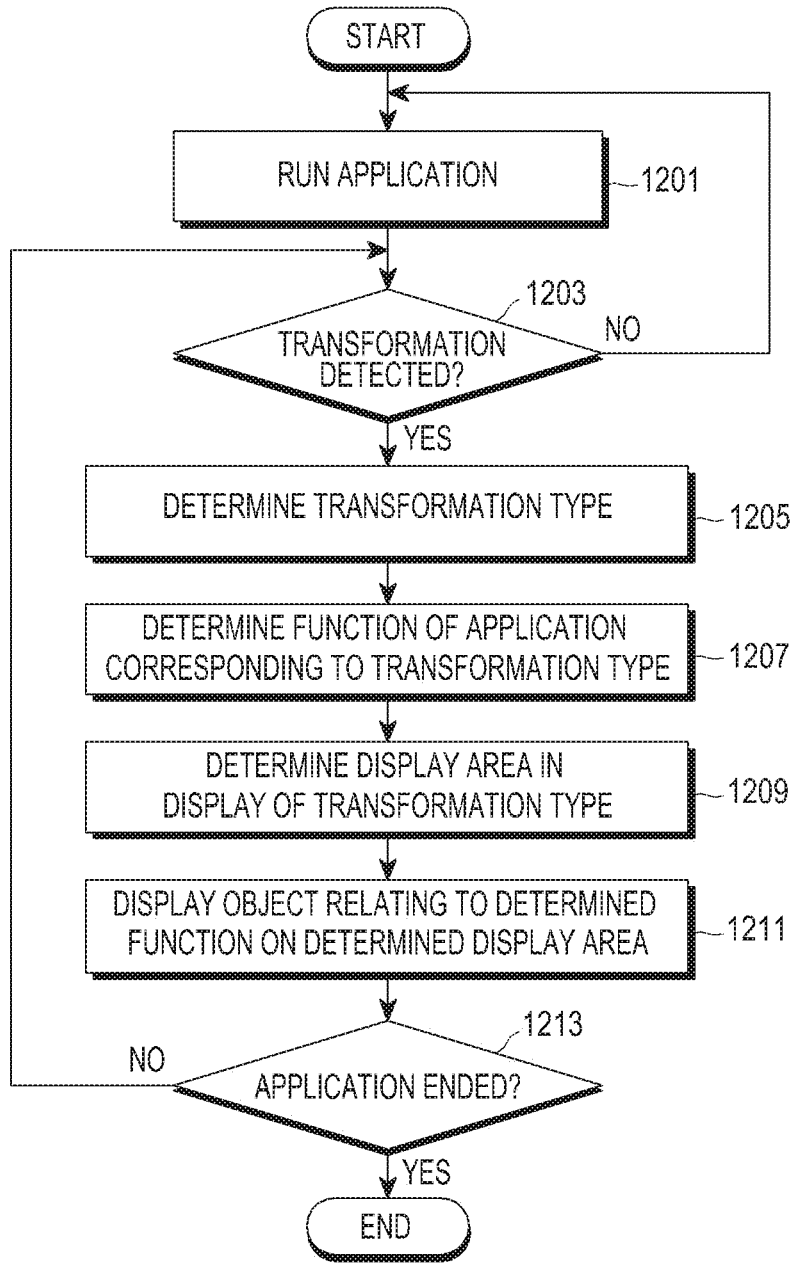
FIG. 12 is a view illustrating a procedure for operating an electronic device according to an embodiment of the present disclosure.

FIG. 12 is a view illustrating a procedure for operating an electronic device according to an embodiment of the present disclosure.

Referring to FIG. 12, according to an embodiment of the present disclosure, an electronic device (e.g., the electronic device 101 of FIG. 1 or the electronic device 200 of FIG. 2) may start to run an application according to the occurrence of a particular event or the user's request in operation 1201. Here, the particular event may include at least one of, e.g., occurrence of a call, reception of a message, or running of a function reserved.

In operation 1203, when the application runs, the electronic device may identify whether its current shape resulted from a change in its default form. According to an embodiment of the present disclosure, where the electronic device is outspread (or flat) as its default form, the electronic device may identify whether the current shape resulted from a change made to the outspread form. For example, upon detecting that the current shape of the display resulted from a change made to the outspread form, i.e., a bend of the display, the electronic device may identify the direction and degree of the bend of the display. According to an embodiment of the present disclosure, where the current shape is a folded form when the electronic device starts to run the application, the electronic device may identify whether the current shape of the folded form changes. For example, upon detecting a change in the current shape of the folded form, i.e., the change of the spread of the display, the electronic device may identify the direction and degree of the spread of the display.

Unless the electronic device is determined to transform, the electronic device may subsequently perform a function of the running application in operation 1201.

When the electronic device is determined to transform in operation 1203, the electronic device may perform operation 1205. In operation 1205, the electronic device may determine the type of the transformation of the display or housing of the electronic device. Here, the electronic device may determine the transformation of the display by various sensors as shown in FIGS. 3 and 9A, 9B, 10A, 10B, and 11 or a program capable of identifying a bend and mount of the display. Further, the electronic device may determine the transformation type of the display based on signals sensed by the sensors or information about the result measured by the program.

In operation 1207, the electronic device may identify the function of the application corresponding to the determined transformation type. The electronic device may previously set a proper function for the application per transformation type, and upon detecting transformation, the electronic device may determine the function corresponding to the determined transformation type. Further, upon sensing the transformation, the electronic device may extract feature information about the transformation type and provide information about at least one function relating to the extracted feature information, e.g., a list or popup message containing information for identifying functions, to the user. Among at least function provided, the most appropriate function may be chosen by the user's selection or automatically depending on a condition previously set by the user. Here, the feature information may include at least one of information about, e.g., the position of the camera module, the position of the speaker, and whether the display area is the display formed on the inside (e.g., the first surface) or on the outside (e.g., the second surface) and information about the number of display areas into which the display is divided, and information relating to the bend (e.g., the direction and degree of the bend) or information relating to the form of the mount.

In operation 1209, the electronic device may determine at least one display area according to the identified function in the display transformed in the transformation type. Here, the electronic device may choose a main display area among the at least one display area identified in order to display an object relating to the determined function.

In operation 1211, thus, the electronic device may display the object relating to the identified function on the determined display area. Further, when the main display area is chosen among the at least one display area determined in operation 1209, the electronic device may display the object relating to the identified function on the main display area. Here, where there is at least one other display area than the chosen main display area, the electronic device may display some objects of the identified function, an object relating to a function previously run of the application, or a main object (an image, text, or video) of the application on the, at least one, other display area determined.

In operation 1213, the electronic device may identify whether the application currently running is terminated. Here, the electronic device may identify whether the application is terminated by identifying whether a termination input signal is received according to the selection of an object displayed on the determined display area or a particular gesture instructing to terminate the application in the current form of the transformed display.

Unless the running application is identified in operation 1213 to be terminated, the electronic device may identify whether there is a change in shape in operation 1203 and then repeat the subsequent operations.

When the application currently running is determined to be terminated in operation 1213, the electronic device may remove all of the objects relating to the application from the display area, which has been determined according to the determined transformation type, and display objects for a standby screen or home screen.

A method for running an appropriate function of an application currently running as the electronic device transforms is described in greater detail according to an embodiment of the present disclosure.

Figure 13:
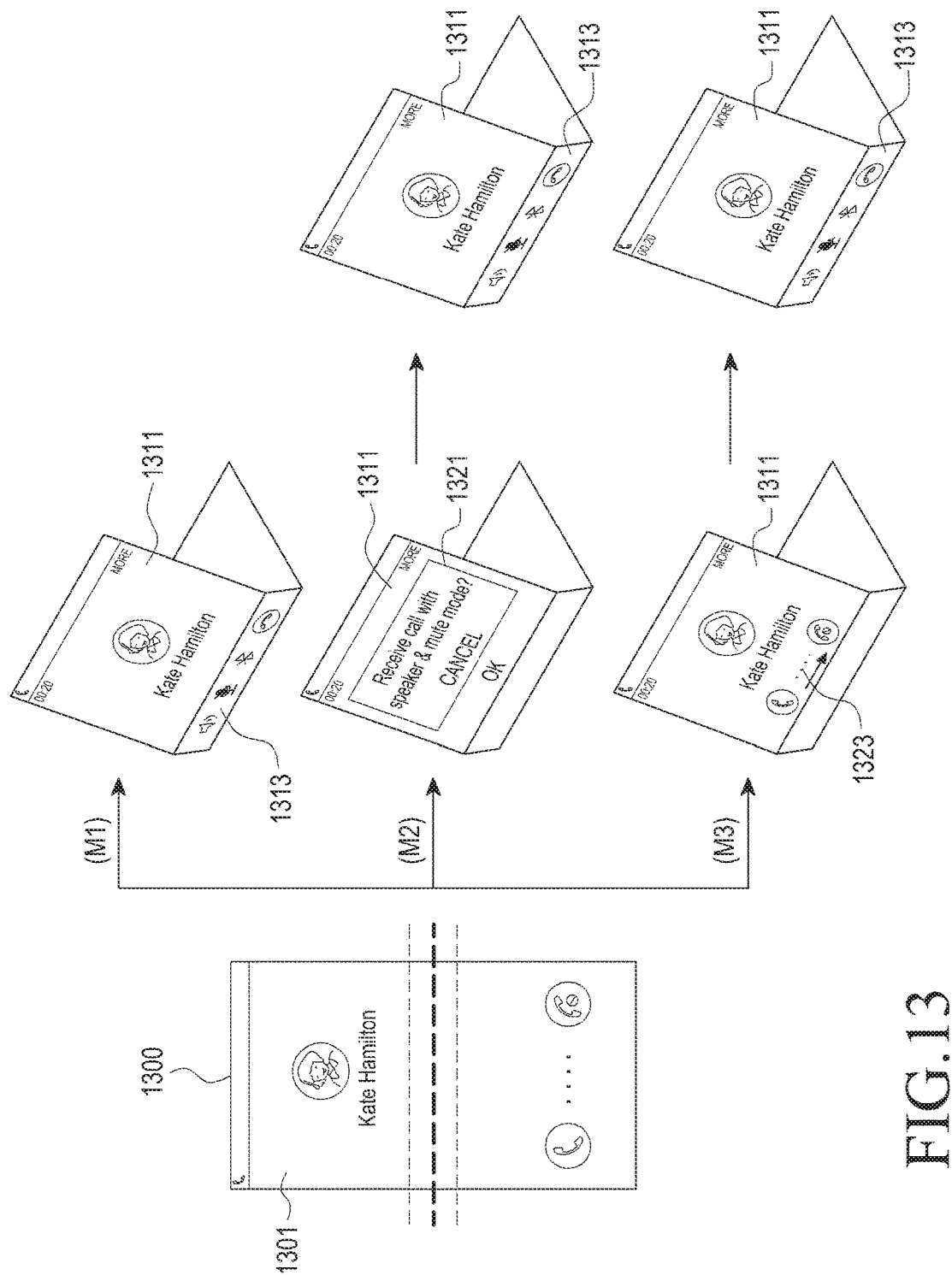
FIGS. 13 to 15 are views illustrating operations for running a function as per the transformation of a display of an electronic device according to various embodiments of the present disclosure.
Figure 14:
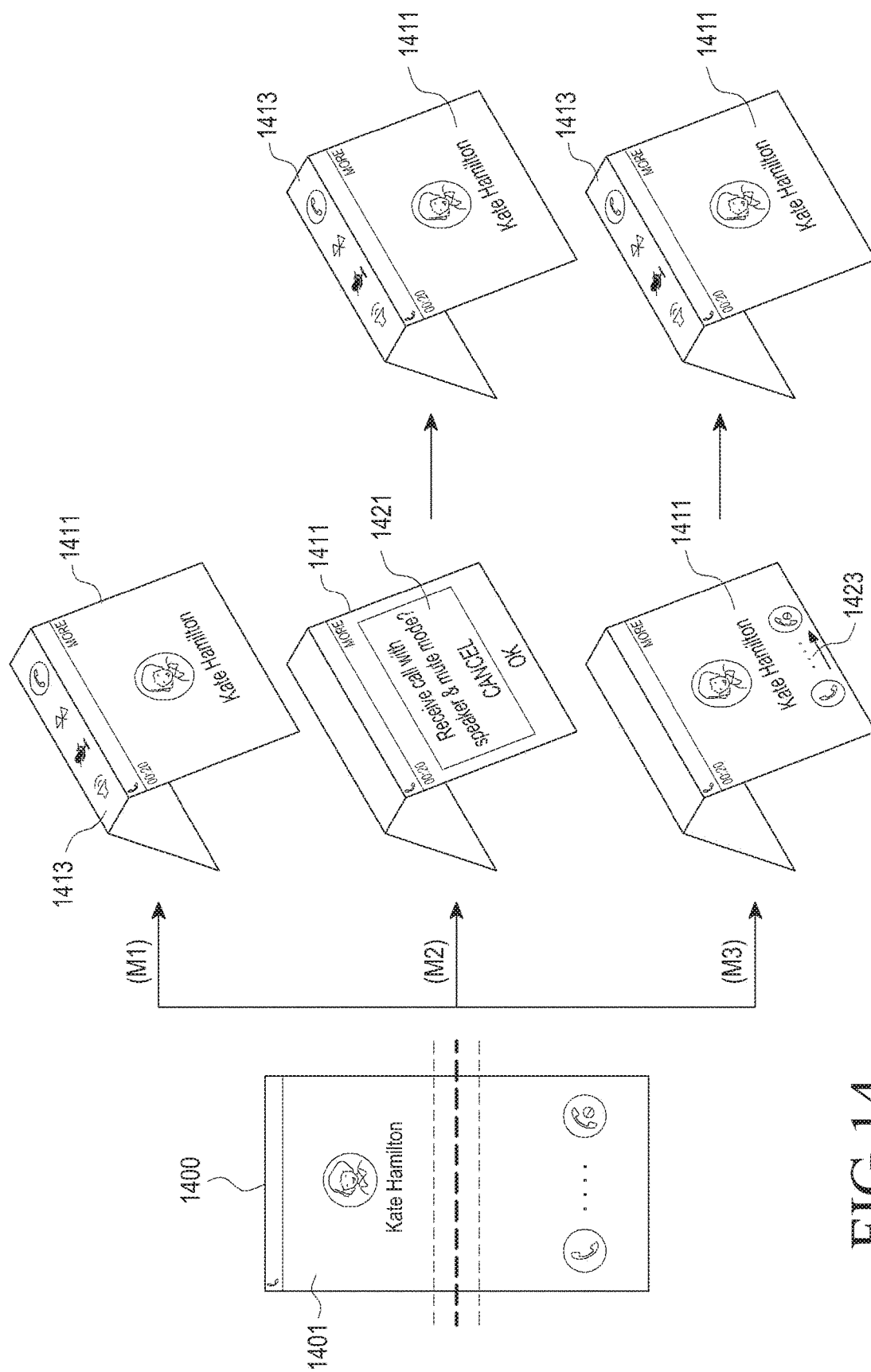
Figure 15:
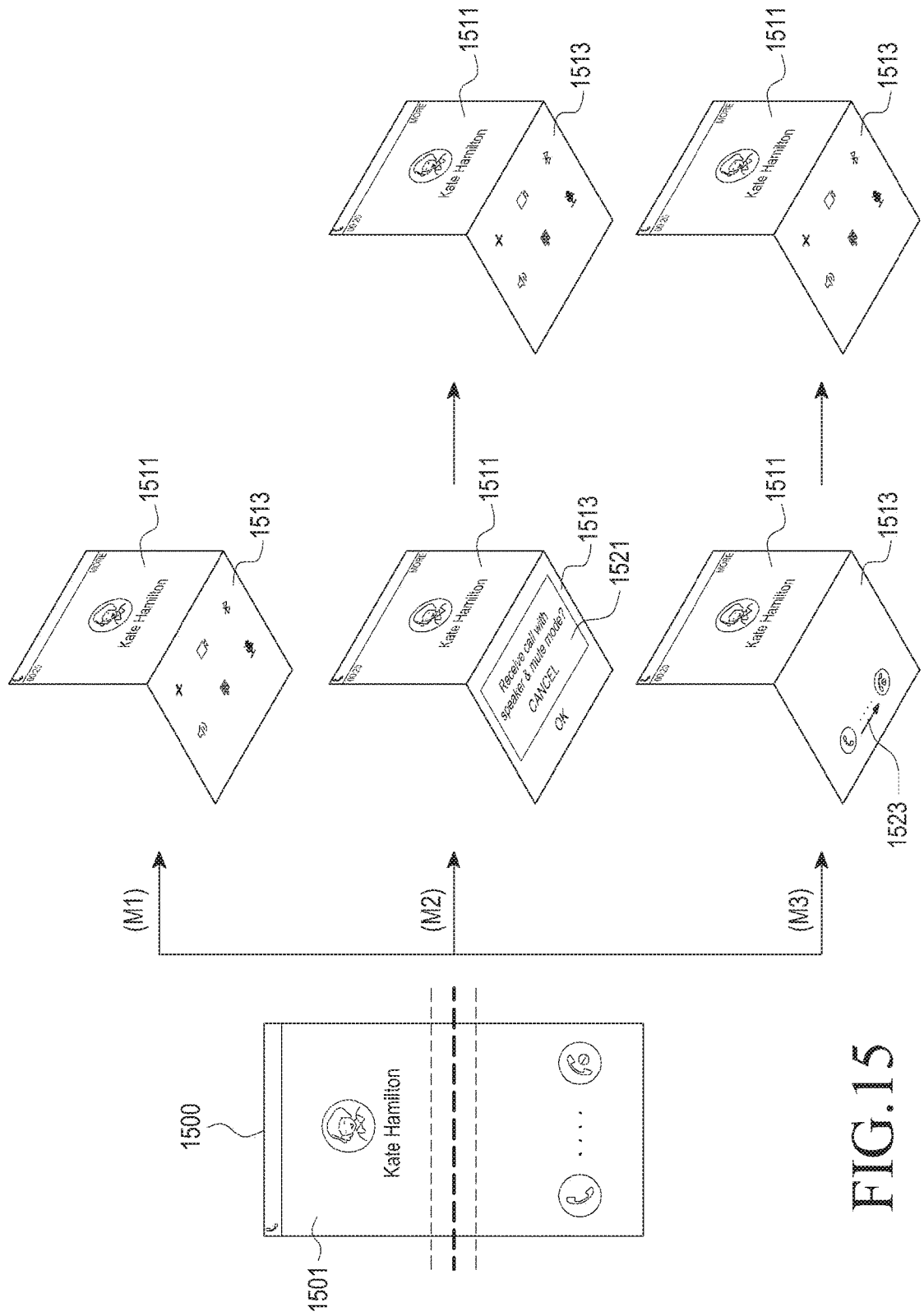

FIGS. 13 to 15 are views illustrating operations for running a function as per the transformation of a display of an electronic device according to various embodiments of the present disclosure.

Referring to FIGS. 13 to 15, the currently running application may be, e.g., a phone call-related application, and the default form of the electronic device when a phone call occurs may be, e.g., an outspread form.

Referring to FIG. 13, where a phone call begins or runs, the electronic device may identify whether the default form of the display 1300, e.g., an outspread form, is subject to a change. Here, the electronic device may display default objects (text, image, or video) as the phone call occurs. For example, the electronic device may display, on the default display screen 1301, objects relating to call reception or performing a phone call according to call reception.

Upon detecting a transformation when the call is received or while talking on the phone with the opposite party after the call reception, the electronic device may determine the type of the transformation based on a sensed signal. When the electronic device determines the transformation type (e.g., the B-1 type) and is mounted for a preset time, the electronic device may select a function suitable for the B-1 type among functions relating to the phone call currently running. For example, when the display transforms into the B-1 type and the electronic device remains mounted for the preset time, the electronic device may determine that the electronic device is not in the state of being brought close to the user's ear to proceed with the call, switch into a speaker function so that the call reception is performed through the audio output speaker, and receive the call in the switched speaker function. Further, upon detecting particular information indicating, e.g., that the speaker is positioned adjacent to the second display area, the electronic device may perform a function for blocking (e.g., a mute mode) or turning down the audio output sound in the speaker function.

Upon determining that the display panel 1300 is in a B-1 type (e.g., the B-1 type of FIG. 7) in which the display panel 1300 is bent in the direction facing the second surface with respect to the dotted line marked, the electronic device may display an object relating to the call reception on a display area determined according to the B-1 type of the display panel 1300.

The electronic device may determine the display area to display the call reception-related object in the display. In the case of M1 in FIG. 13, the electronic device may determine a first display area 1311 and a fourth display area 1313 as display areas for displaying the object relating to the call reception. For example, the electronic device may display objects relating to the call sender according to the call reception on the first display area 1311 and objects for the currently running function (e.g., the mute function) on the fourth display area 1313. Further, when the first display area 1311 is chosen as the main display area, the electronic device may display an object (e.g., an object indicating that the electronic device is in the mute mode) relating to the currently switched function on the first display area 1311 and an object relating to another function (e.g., call termination, video call, or function switch) for the call reception on the fourth display area 1313.

In the cases of M2 and M3 in FIG. 13, the electronic device may display, on the determined first display area 1311, information (e.g., a popup message 1321) to receive the user's confirmation before switching into the function identified for the application and running the function or a graphic element 1323 relating to the running of the application. Thereafter, upon receiving a user input signal entered by the user according to the information displayed on the first display area 1311, the electronic device may run the switched function of the application corresponding to the B-1 type and display the default object relating to the call reception and the object relating to the switched function on the first display area 1311 and the fourth display area 1313.

Referring to FIG. 14, where a phone call begins or runs, the electronic device may identify whether the default form of the display 1400, e.g., an outspread form, is subject to a change. Here, the electronic device may display default objects (text, image, or video) as the phone call occurs. For example, the electronic device may display, on the default display screen 1401, objects relating to call reception or performing a phone call according to call reception.

Upon detecting a transformation when the call is received or while talking on the phone with the opposite party after the call reception, the electronic device may determine the type of the transformation based on a sensed signal. When the electronic device determines the transformation type (e.g., the B-2 type) and is mounted for a preset time, the electronic device may select a function suitable for the B-2 type among functions relating to the phone call currently running. For example, when the display transforms into the B-2 type and the electronic device remains mounted for the preset time, the electronic device may determine that the electronic device is not in the state of being brought close to the user's ear to proceed with the call and switch into the speaker function so that the call reception is performed through the audio output speaker. Further, the electronic device may determine that the B-2 type is a type in which the fourth display area can be used and may switch into a preset function or a function selected from searched functions, e.g., a function in which a graphic element for controlling a phone call can be displayed.

Upon determining that the display panel 1400 is in a B-2 type (e.g., the B-2 type of FIG. 7) in which the display panel 1400 is bent in the direction facing the second surface with respect to the dotted line marked, the electronic device may, as in the cases of M1 to M3, display the call reception-related object on a display area determined according to the B-2 type of the display panel 1400.

The electronic device may determine the display area to display the call reception-related object in the display. In the case of M1 in FIG. 14, the electronic device may determine a first display area 1411 and a fourth display area 1413 as display areas for displaying the object relating to the call reception. For example, the electronic device may display default objects relating to the call sender according to the call reception on the first display area 1411 and objects for the currently running function (e.g., the control function) on the fourth display area 1413.

In the cases of M2 and M3 in FIG. 14, the electronic device may display, on the determined first display area 1411, information (e.g., a popup message 1421) to receive the user's confirmation before switching into the function identified for the application and running the function or a graphic element 1423 relating to the running of the application. Thereafter, upon receiving a user input signal entered by the user according to the information displayed on the first display area 1411, the electronic device may run the switched function of the application corresponding to the B-2 type and display the default object relating to the call reception and the object relating to the switched function on the first display area 1411 and the fourth display area 1413.

Referring to FIG. 15, where a phone call begins or runs, the electronic device may identify whether the default form of the display 1500, e.g., an outspread form, is subject to a change. Here, the electronic device may display default objects (text, image, or video) as the phone call occurs. For example, the electronic device may display, on the default display screen 1501, objects relating to call reception or performing a phone call according to call reception.

Upon detecting a transformation when the call is received or while talking on the phone with the opposite party after the call reception, the electronic device may determine the type of the transformation based on a sensed signal. When the electronic device determines the transformation type (e.g., the F-1 type) and is mounted for a preset time, the electronic device may select a function suitable for the F-1 type among functions relating to the phone call currently running. For example, when the display 1500 transforms into the F-1 type and the electronic device remains mounted for the preset time, the electronic device may determine that the electronic device is not in the state of being brought close to the user's ear to proceed with the call and switch into the speaker function so that the call reception is performed through the audio output speaker. Further, the electronic device may determine that the F-1 type is a type in which the first display area 1511 and second display area 1513 both can be used and may switch into a preset function or a function selected from searched functions, e.g., a function in which a graphic element for controlling a phone call can be displayed, e.g., a multi-party call, video call, or conference call function.

Upon determining that the display panel 1500 is in a F-1 type (e.g., the F-1 type of FIG. 7) in which the display panel 1500 is bent in the direction facing the first surface (e.g., bent forwards) with respect to the dotted line marked, the electronic device may, as in the cases of M1 to M3, display the call reception-related object on a display area determined according to the F-1 type of the display 1500.

The electronic device may determine the display area to display the call reception-related object in the display 1500. In the case of M1 in FIG. 15, the electronic device may determine a first display area 1511 and a second display area 1513 as display areas for displaying the object relating to the call reception. For example, the electronic device may display default objects relating to the call sender according to the call reception on the first display area 1511 and objects for the currently running function (e.g., the control function) on the second display area 1513.

In the cases of M2 and M3 in FIG. 15, the electronic device may display, on the determined second display area 1513, information (e.g., a popup message 1521) to receive the user's confirmation before switching into the function identified for the application and running the function or a graphic element 1523 relating to the running of the application. Thereafter, upon receiving a user input signal entered by the user according to the information displayed on the first display area 1511, the electronic device may run the switched function of the application corresponding to the F-1 type and display the default object relating to the call reception and the object relating to the switched function on the first display area 1511 and the second display area 1513.

Figure 16:
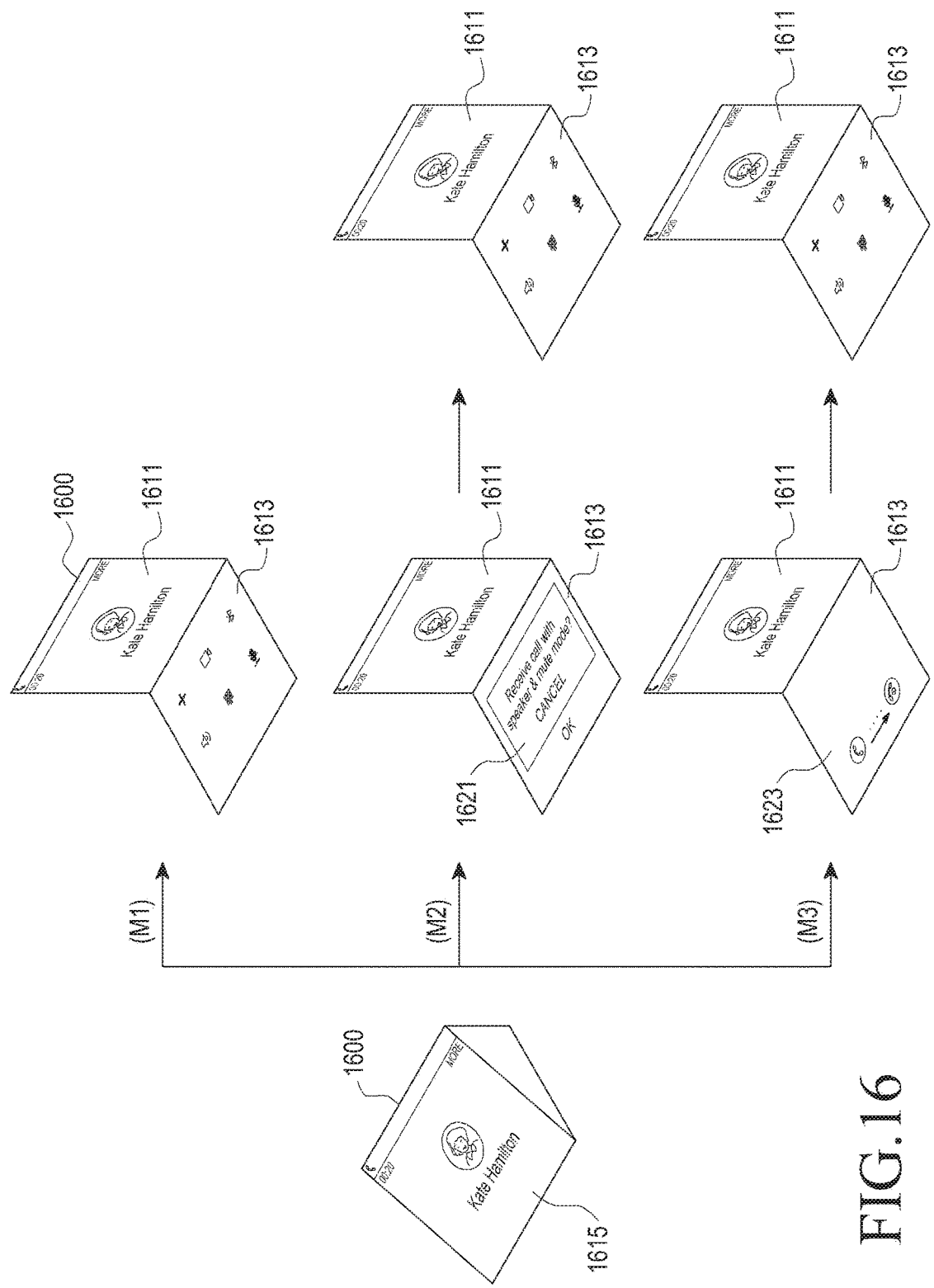
FIGS. 16 and 17 are views illustrating operations for running a function as per the transformation of a display of an electronic device according to various embodiments of the present disclosure.
Figure 17:
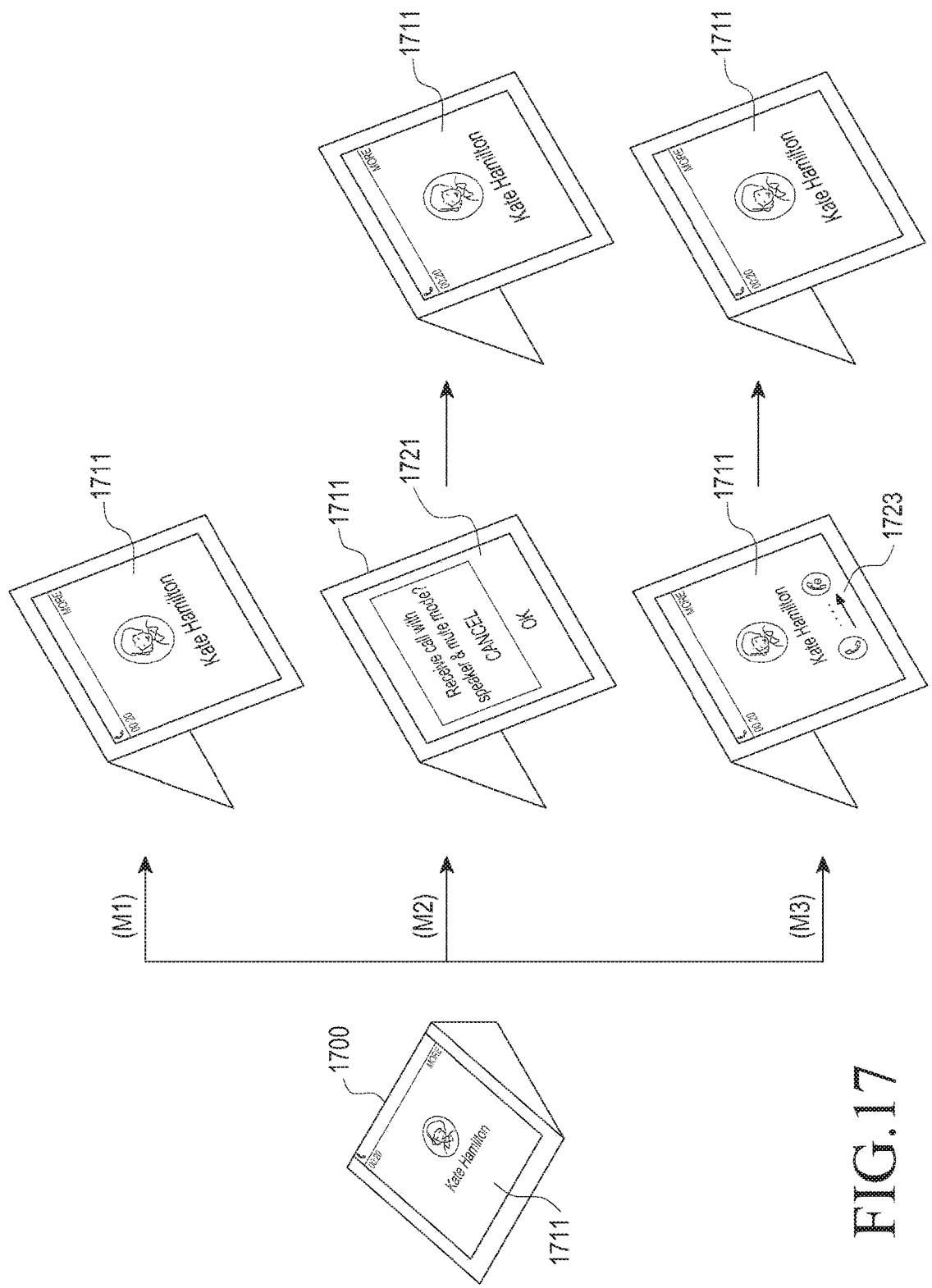

FIGS. 16 and 17 are views illustrating operations for running a function as per the transformation of a display of an electronic device according to an embodiment of the present disclosure.

In various embodiments described with reference to FIGS. 16 and 17, the currently running application may be, e.g., a phone call-related application, and the default form of the electronic device when a phone call occurs may be, e.g., a state in which the electronic device is mounted in the folded form.

Referring to FIG. 16, where a phone call begins or runs, the electronic device may identify whether the default form of the display 1600, e.g., a folded form, is subject to a change. Here, the electronic device may display default objects (text, image, or video) on a third display area 1615 as the phone call occurs. For example, the electronic device may display objects relating to call reception or performing a phone call according to call reception on the third display area 1615 that is in the default form.

Upon detecting a transformation when the call is received or while talking on the phone with the opposite party after the call reception, the electronic device may determine the type of the transformation based on a sensed signal. When the electronic device determines the transformation type (e.g., the F-1 type) and is mounted for a preset time, the electronic device may select a function suitable for the F-1 type among functions relating to the phone call currently running. For example, when the display 1600 transforms into the F-1 type and the electronic device remains mounted for the preset time, the electronic device may determine that the electronic device is not in the state of being brought close to the user's ear to proceed with the call and switch into the speaker function so that the call reception is performed through the audio output speaker. Further, the electronic device may determine that the F-1 type is a type in which the first display area 1611 and second display area 1613 both can be used and may switch into a preset function or a function selected from searched functions, e.g., a function in which a graphic element for controlling a phone call can be displayed, e.g., a multi-party call, video call, or conference call function.

Upon determining that the display panel 1600 is in a F-1 type (e.g., the F-1 type of FIG. 7) in which the display panel 1600 is bent in the direction facing the first surface (e.g., bent forwards) with respect to the dotted line marked, the electronic device may, as in the cases of M1 to M3, display the call reception-related object on a display area determined according to the F-1 type of the display 1500.

The electronic device may determine the display area to display the call reception-related object in the display 1600. In the case of M1 in FIG. 15, the electronic device may determine a first display area 1611 and a second display area 1613 as display areas for displaying the object relating to the call reception. For example, the electronic device may display default objects relating to the call sender according to the call reception on the first display area 1611 and objects for the currently running function (e.g., the control function) on the second display area 1613.

In the cases of M2 and M3 in FIG. 16, the electronic device may display, on the determined second display area 1613, information (e.g., a popup message 1621) to receive the user's confirmation before switching into the function identified for the application and running the function or a graphic element 1623 relating to the running of the application. Thereafter, upon receiving a user input signal entered by the user according to the information displayed on the first display area 1611, the electronic device may run the switched function of the application corresponding to the F-1 type and display the default object relating to the call reception and the object relating to the switched function on the first display area 1611 and the second display area 1613.

Referring to FIG. 17, where a phone call begins or runs, the electronic device may identify whether the default form of the display 1700, e.g., a folded form, is subject to a change. Here, the electronic device may display default objects (text, image, or video) as the phone call occurs. For example, the electronic device may display objects relating to call reception or performing a phone call according to call reception on the third display area 1711 that is in the default form.

Upon detecting a transformation when the call is received or while talking on the phone with the opposite party after the call reception, the electronic device may determine the type of the transformation based on a sensed signal. When the electronic device determines the transformation type (e.g., the S-2 type) and is mounted for a preset time, the electronic device may select a function suitable for the S-2 type among functions relating to the phone call currently running. For example, when the display transforms into the S-2 type and the electronic device remains mounted for the preset time, the electronic device may determine that the electronic device is not in the state of being brought close to the user's ear to proceed with the call and switch into the speaker function so that the call reception is performed through the audio output speaker. Further, the electronic device may determine that the S-2 type is a type in which the third display area 1711 alone can be used and may switch into or simultaneously run a preset function or a function selected from searched functions, e.g., a function in which audio information is displayed as text or brief information is displayed.

Upon determining that the display panel 1700 is in the S-2 type (e.g., the S-2 type of FIG. 7) in which the display panel 1700 is bent in the direction facing the first surface (e.g., bent forwards) with respect to the dotted line marked, the electronic device may, as in the cases of M1 to M3, display the call reception-related object on a display area determined according to the S-2 type of the display panel 1700.

The electronic device may determine the display area to display the call reception-related object in the display. In the case of M1 in FIG. 17, the electronic device may determine the third display area 1711 as the display area for displaying the object relating to the call reception. For example, the electronic device may display default objects relating to the call sender according to the call reception on the third display area 1711 and objects for the currently running function (e.g., the control function) on the third display area 1711.

In the cases of M2 and M3 in FIG. 17, the electronic device may display, on the determined third display area 1711, information (e.g., a popup message 1721) to receive the user's confirmation before switching into the function identified for the application and running the function or a graphic element 1723 relating to the running of the application. Thereafter, upon receiving a user input signal entered by the user according to the information displayed on the first display area 1711, the electronic device may run the switched function of the application corresponding to the S-2 type and display the default object relating to the call reception and the object relating to the switched function on the third display area 1711.

Figure 18:
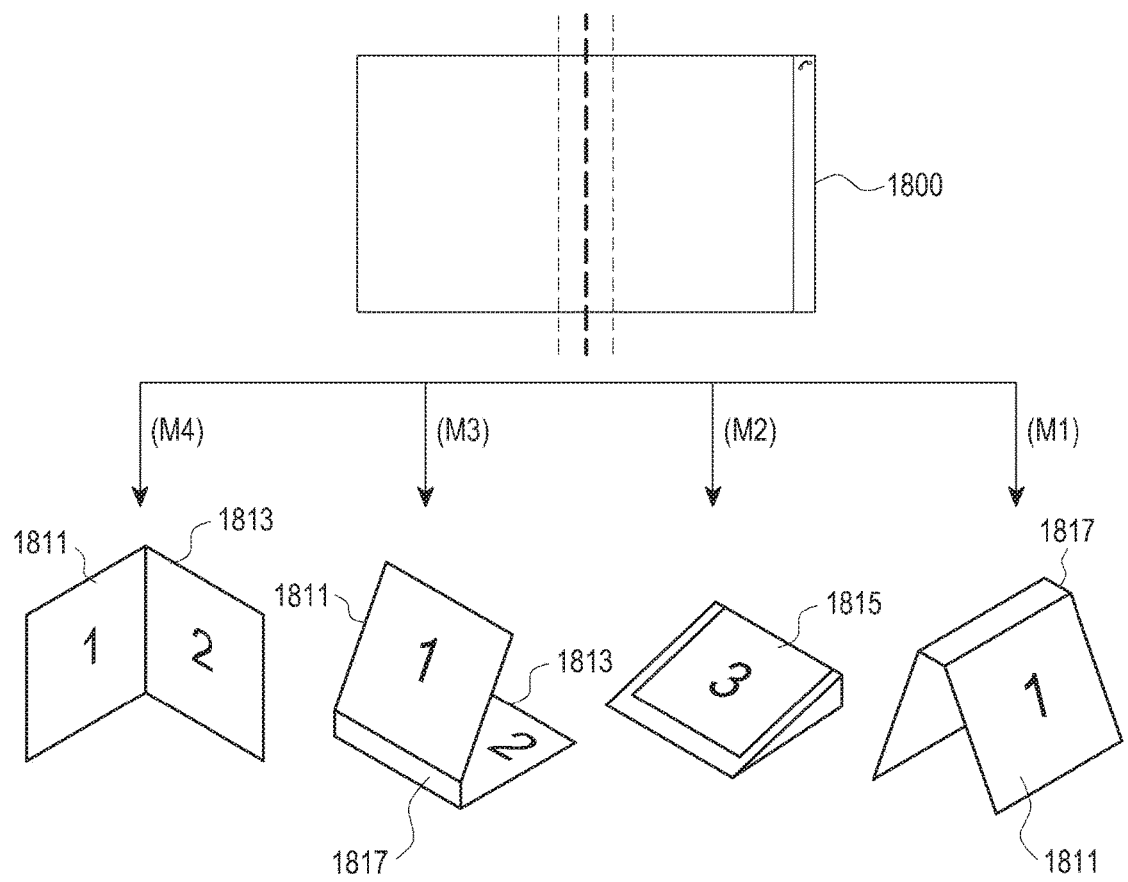
FIG. 18 is a view illustrating operations for running a function as per the transformation of a display of an electronic device according to an embodiment of the present disclosure.

FIG. 18 is a view illustrating operations for running a function as per the transformation of a display of an electronic device according to an embodiment of the present disclosure.

In various embodiments described with reference to FIG. 18, the currently running application may be, e.g., an audio or video player-related application, and the default form of the electronic device when a video or audio is played on the electronic device may be, e.g., an outspread form.

Referring to FIG. 18, when or while the audio or video is played or being played, the electronic device may identify whether the default form of the display 1800, e.g., an outspread form, is subject to a change. Here, the electronic device may display default objects (text, image, or video) relating to, e.g., music play.

Upon detecting a transformation while playing music, the electronic device may determine the type of the transformation based on a sensed signal.

In the case of M1 in FIG. 18, upon determining that the electronic device is mounted for a preset time in the transformation type (e.g., the B-2 type) of the display, the electronic device may determine a function (e.g., a control function) appropriate for the B-2 type among functions for the music play currently running. Further, the electronic device may determine that the display areas for displaying a music play-related object are the first display area 1811 and the fourth display area 1817 in the display 1800. The electronic device may display the music play-related object (e.g., an album cover image) on the first display area 1811 and objects (e.g., graphic elements, such as playback, go to previous track, go to next track, pause, or volume up/down) for the currently running function (e.g., the control function) on the fourth display area 1817. Here, the control function-related objects may be represented as touchable buttons.

Further, in the case of M2 in FIG. 18, upon determining that the electronic device is mounted for a preset time in the transformation type (e.g., the S-1 type) of the display, the electronic device may determine a function (e.g., a panel control function or preview function) appropriate for the S-1 type among functions for the music play currently running. Further, the electronic device may determine that the display areas for displaying a music play-related object are the third display area 1815 in the display 1800. The electronic device may display the music play-related object (e.g., an album cover image, preview image, or brief information) on the third display area 1815 and control objects (e.g., graphic elements, such as playback, go to previous track, go to next track, pause, or volume up/down) for playing music on the third display area 1815. Here, the control function-related objects may be touchable buttons that are hidden or avoided from display while the default objects are being displayed, and when an input of a particular gesture is sensed, show up on the third display area 1815. Further, the electronic device may abstain from displaying the control function-related objects on the third display area 1815 and perform only a control function corresponding to a signal sensed by the touch sensors.

Further, in the case of M3 in FIG. 18, upon determining that the electronic device is mounted for a preset time in the transformation type (e.g., the B-1 type) of the display, the electronic device may determine a function (e.g., a mute function) appropriate for the B-1 type among functions for the music play currently running. Further, the electronic device may determine that the display areas for displaying a music play-related object are the first display area 1811 and the fourth display area 1817 in the display 1800. The electronic device may display the music play-related object (e.g., information about the album cover image, video, subtitle or music being played) on the first display area 1811 and control objects (e.g., graphic elements, such as playback, go to previous track, go to next track, pause, or volume up/down) for playing music on the fourth display area 1817. Here, in the B-1 type, the second display area may remain in contact with the floor, and when the speaker is positioned in the second display area, the electronic device may switch into the mute function for turning down the music play sound and run.

Further, in the case of M4 in FIG. 18, upon determining that the electronic device is mounted for a preset time in the transformation type (e.g., the F-2 type) of the display, the electronic device may determine a function (e.g., a speaker function) appropriate for the F-2 type among functions for the music play currently running. Further, the electronic device may determine that the display areas for displaying a music play-related object are the first display area 1811 and the second display area 1813 in the display 1800. The electronic device may display the music play-related object (e.g., the album cover image or video) on the first display area 1811 and additional objects (e.g., subtitle or music-related information) for playing music on the second display area 1813. Here, since, in the F-2 type, the speaker is positioned adjacent to the second display area 1813, and the second display area 1817 faces the user, the electronic device may switch into a function for turning up the music play sound and run.

Figure 19:
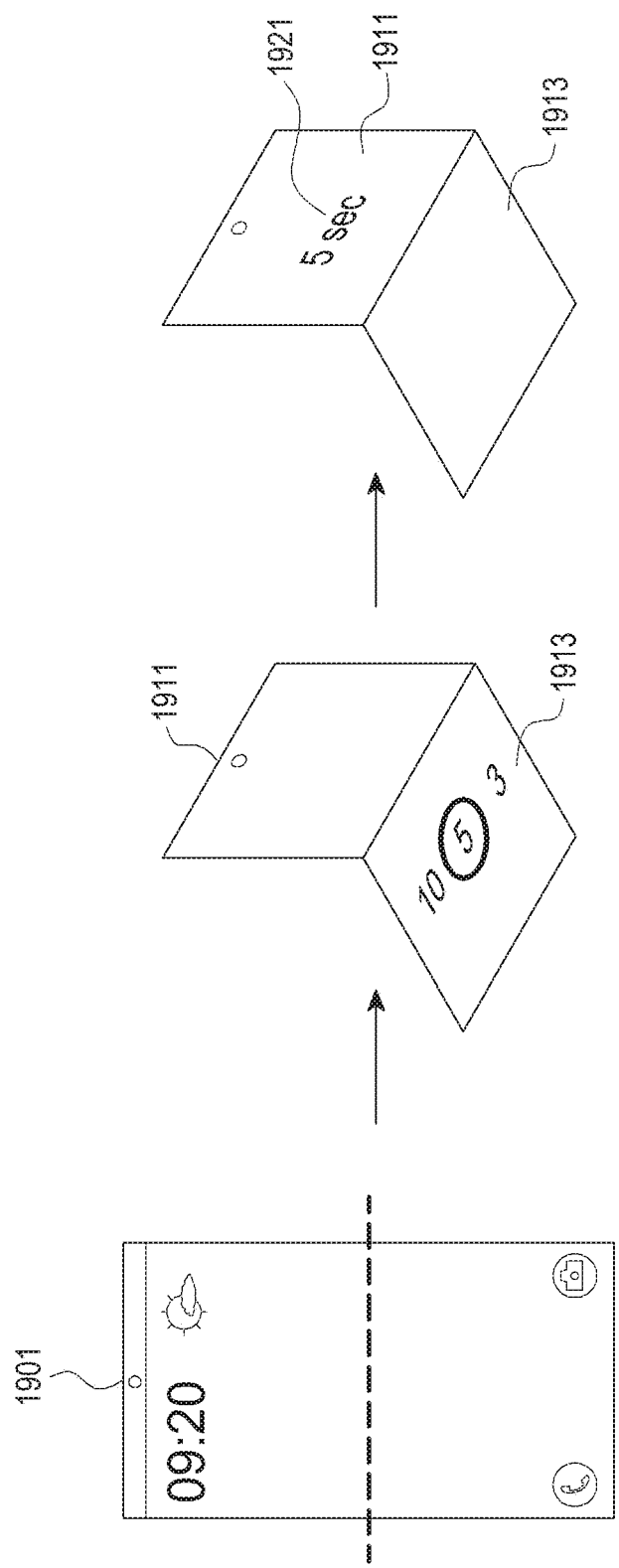
FIGS. 19 and 20 are views illustrating operations for running a function as per the transformation of a display of an electronic device according to various embodiments of the present disclosure.
Figure 20:
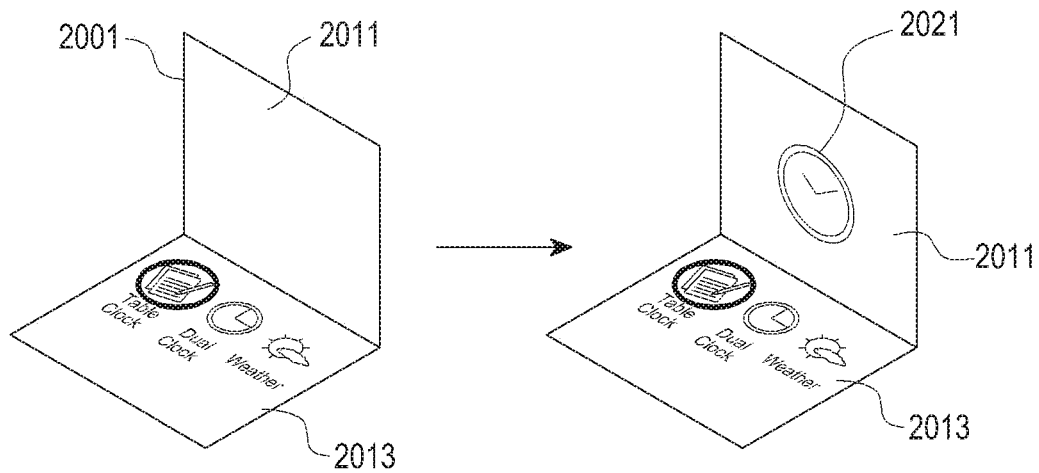

FIGS. 19 and 20 are views illustrating operations for running a function as per the transformation of a display of an electronic device according to various embodiments of the present disclosure.

Referring to FIG. 19, the electronic device is currently in the state of running an image capturing application. Upon detecting the transformation of the display 1901 into the F-1 type with respect to the axis of the bend, the electronic device may determine a timer function corresponding to the F-1 type and run the timer function. Here, the F-1 type is, e.g., a type in which the display is transformed so that the camera module positioned adjacent to the first display area 1911 faces the user. Further, upon determining that the display is transformed into the F-1 type and the electronic device is mounted in the type, the electronic device may identify that such setting has been made that the user may fulfill image capturing without manipulating the electronic device. Thus, the electronic device may run the timer function for, e.g., photographing, and may display a timer function-related object on the second display area 1913. Here, according to a user input, the electronic device may display, on the first display area 1911, an object 1921 for running the timer function run according to the user input and may display, on the second display area 1913, default objects for the image capturing application.

Referring to FIG. 20, the electronic device is currently in the state of running a home screen function. Upon detecting the transformation of the display 2001 into the F-1 type with respect to the axis of the bend, the electronic device may run a function (e.g., a switch and display object function) set corresponding to the F-1 type among objects displayed on the home screen when running the home screen function. For example, upon detecting the F-1 type, the electronic device may display an object, e.g., a widget 2021 set by the user among the objects displayed on the home screen, on the first display area 2011 which is determined to be the main display area and display the other objects, which were displayed on the home screen, on another determined display area, i.e., the second display area 2013.

Figure 21:
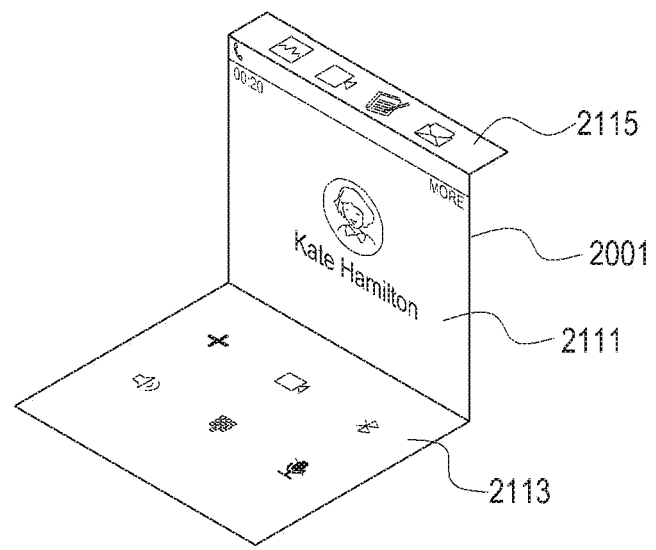
FIGS. 21 and 22 are views illustrating operations for running a function as per the transformation of a display of an electronic device according to various embodiments of the present disclosure.
Figure 22:
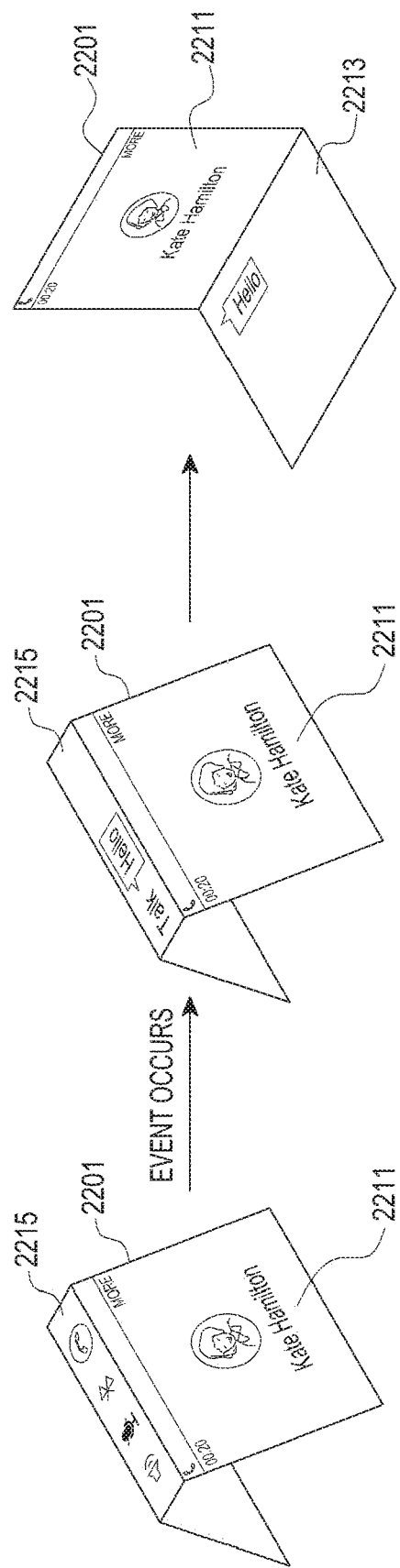

FIGS. 21 and 22 are views illustrating operations for running a function as per the transformation of a display of an electronic device according to various embodiments of the present disclosure.

Referring to FIG. 21, while the application runs with the display transformed, the electronic device may detect the occurrence of an event for another application. In such case, upon determining that the electronic device transforms from the current transformation type to another transformation type, the electronic device may display an object for the other application in the determined transformation type on the main display area 2115 that is determined in the current transformation type. Here, in the other transformation type, the electronic device may keep running the previous application displayed on the display areas determined in the previous transformation type (e.g., the first display area 2111 and the second display area 2113). The electronic device may display an object for the other application on the third display area 2115 chosen in the other transformation type identified. Here, the display area chosen in the other transformation type may be, e.g., the display area (e.g., the third display area) positioned on the second surface or the display area of the expanded second display and may differ from the display areas (e.g., the first display area and second display area) determined in the previous transformation type.

Referring to FIG. 22, while a function of a first application corresponding to the current transformation type (e.g., B-2) of the display 2201 runs, when an event for another application (e.g., a second application) occurs, the electronic device may display an object relating to the function run as per the occurrence of the event on the determined display area, e.g., the fourth display area 2215. For example, when receiving a chat message for a messenger application while running the first application for a phone call, the electronic device may display an object (e.g., "Hello") relating to the received chat message on the fourth display area 2215. In this case, the electronic device may keep running the function of the first application while displaying the object relating to the function of the first application, as it is, on the first display area 2211 determined in the B-2 type. Here, upon detecting the transformation of the display 2201, the electronic device may determine that the display transforms from the B-2 type to the F-1 type. Accordingly, the electronic device may determine display areas for use as per the F-1 type, select a display area to display an object relating a function of the second application as per the running of the function of the first application among the determined display areas (e.g., the first display area 2211 and the second display area 2213), and display the object relating to the function of the second application on the selected display area (e.g., the second display area 2213).

According to an embodiment of the present disclosure, a method for running a function on an electronic device may comprise running an application, obtaining information relating to a shape of the bend of a display and a form of a mount of the electronic device based on information sensed by at least one sensor, determining a transformation type of the display based on the information relating to the shape of the bend and the form of the mount, when the electronic device is mounted in the determined transformation type, determining a display area in the display according to a first function of the application corresponding to the transformation type of the display, and displaying an object relating to the first function on the determined display area. According to an embodiment of the present disclosure, the method may further comprise determining whether input information is received by a user or the electronic device moves during a preset time and when the input information is not received or the electronic device does not move, determining that the electronic device is mounted in the determined transformation type.

According to an embodiment of the present disclosure, determining the display area in the display may comprise detecting feature information about the transformation type, determining the first function of the application based on the detected feature information, and determining the display area in the display according to the determined first function.

According to an embodiment of the present disclosure, displaying the object relating to the first function on the determined display area may comprise when the electronic device is determined to be mounted in the determined transformation type during a preset time, running the first function and displaying the object relating to the first function on the determined display area.

According to an embodiment of the present disclosure, determining the transformation type of the display may comprise identifying the form of the mount of the electronic device based on the information relating to the form of the mount while the display remains in the shape of the bend and determining that the transformation type of the display is a transformation type set corresponding to the shape of the bend of the display and the identified form of the mount.

According to an embodiment of the present disclosure, the information relating to the shape of the bend of the display may include at least one of a direction, rotation angle, or resistance of the bend of the display, or an inter-gravity sensor distance. The information relating to the form of the mount may include at least one of information received from at least one sensor sensing whether there is a contact to a floor or information obtained by sensing a user's view received from a camera.

According to an embodiment of the present disclosure, the method may further comprise, when an event for another application occurs while the application runs with the electronic device mounted in the transformation type, displaying an object for a function of the other application corresponding to the current transformation type on the determined display area.

According to an embodiment of the present disclosure, displaying the object for the other application may comprise when the display transforms from the transformation type to another transformation type, determining the other transformation type and displaying an object for a second function of the application on a display area chosen in the other transformation type while keeping running the application. According to an embodiment of the present disclosure, the display area chosen in the other transformation type may be different from the display area displaying the object for the first function of the application in the previous transformation type.

Figure 23:
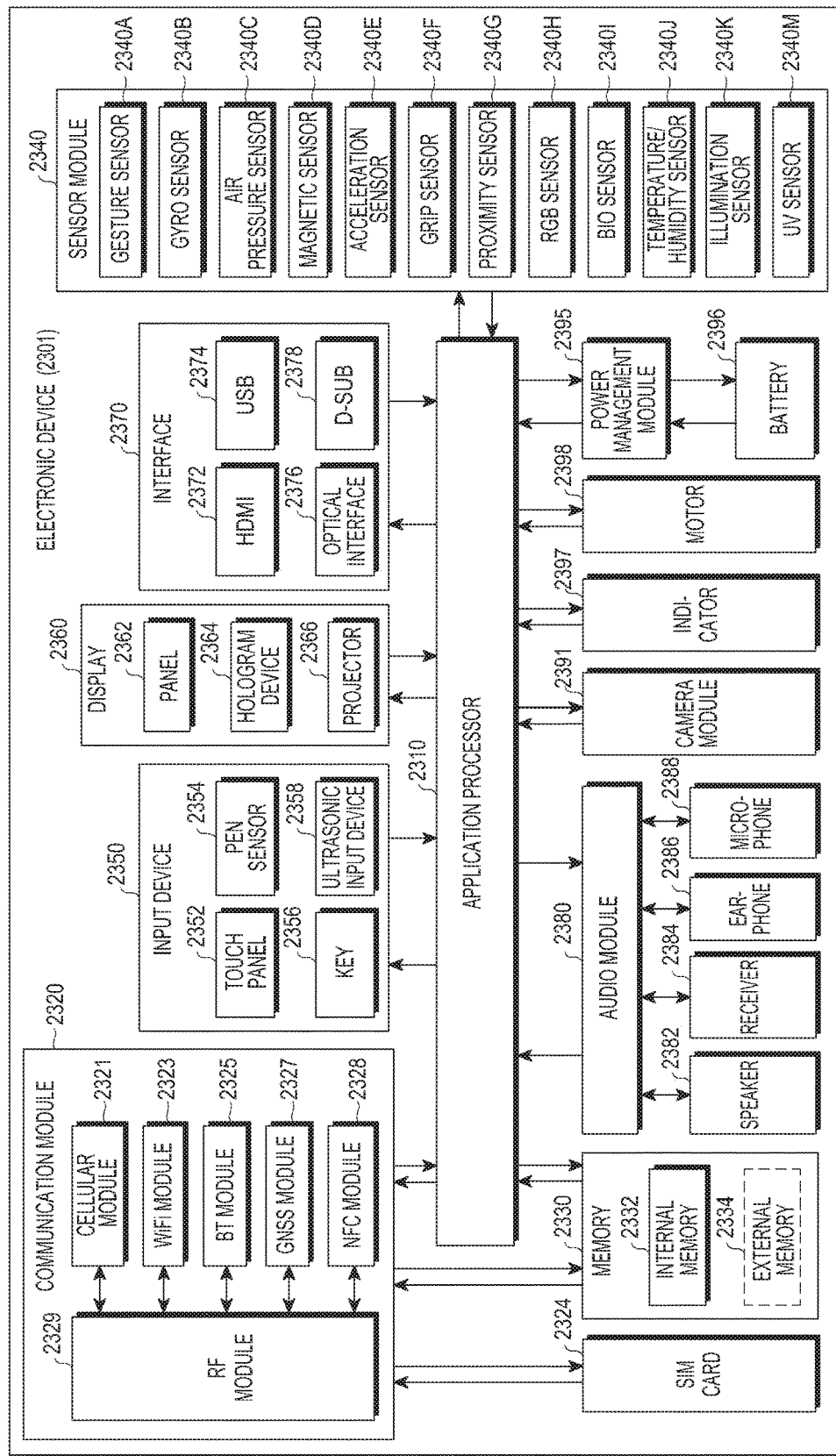
FIG. 23 is a block diagram illustrating an electronic device according to various embodiments of the present disclosure.

FIG. 23 is a block diagram illustrating an electronic device according to an embodiment of the present disclosure.

The electronic device 2301 may include the whole or part of the configuration of, e.g., the electronic device 101 shown in FIG. 1. The electronic device 2301 may include one or more processors (e.g., APs) 2310, a communication module 2320, a subscriber identification module (SIM) 2324, a memory 2330, a sensor module 2340, an input device 2350, a display 2360, an interface 2370, an audio processing unit 2380, a camera module 2391, a power management module 2395, a battery 2396, an indicator 2397, and a motor 2398.

The processor 2310 may control multiple hardware and software components connected to the processor 2310 by running, e.g., an OS or application programs, and the processor 210 may process and compute various data. The processor 2310 may be implemented in, e.g., a system on chip (SoC). According to an embodiment of the present disclosure, the processor 2310 may further include a graphics processing unit (GPU) and/or an image signal processor. The processor 2310 may include at least some (e.g., the cellular module 2321) of the components shown in FIG. 23. The processor 2310 may load a command or data received from at least one of other components (e.g., a non-volatile memory) on a volatile memory, process the command or data, and store various data in the non-volatile memory.

The communication module 2320 may have the same or similar configuration to the communication interface 170 of FIG. 1. The communication module 2320 may include, e.g., a cellular module 2321, a Wi-Fi module 2323, a Bluetooth module 2325, a GNSS module 2327 (e.g., a GPS module, a Glonass module, a Beidou module, or a Galileo module), an NFC module 2328, and a radio frequency (RF) module 2329.

The cellular module 2321 may provide voice call, video call, text, or Internet services through, e.g., a communication network. The cellular module 2321 may perform identification or authentication on the electronic device 2301 in the communication network using a SIM 2324 (e.g., the SIM card). According to an embodiment of the present disclosure, the cellular module 2321 may perform at least some of the functions providable by the processor 2310. According to an embodiment of the present disclosure, the cellular module 2321 may include a CP.

The Wi-Fi module 2323, the Bluetooth module 2325, the GNSS module 2327, or the NFC module 2328 may include a process for, e.g., processing data communicated through the module. According to an embodiment of the present disclosure, at least some (e.g., two or more) of the cellular module 2321, the Wi-Fi module 2323, the Bluetooth module 2325, the GNSS module 2327, or the NFC module 2328 may be included in a single integrated circuit (IC) or an IC package.

The RF module 2329 may communicate data, e.g., communication signals (e.g., RF signals). The RF module 2329 may include, e.g., a transceiver, a power amp module (PAM), a frequency filter, a low noise amplifier (LNA), or an antenna. According to an embodiment of the present disclosure, at least one of the cellular module 2321, the Wi-Fi module 2323, the Bluetooth module 2325, the GNSS module 2327, or the NFC module 2328 may communicate RF signals through a separate RF module.

The subscription identification module 2324 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 2330 (e.g., the memory 130) may include, e.g., an internal memory 2332 or an external memory 2334. The internal memory 2332 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 2334 may include a flash drive, e.g., a compact flash (CF) memory, a SD memory, a micro-SD memory, a mini-SD memory, an xD memory, a multi-media card (MMC), or a Memory Stick™. The external memory 2334 may be functionally and/or physically connected with the electronic device 2301 via various interfaces.

For example, the sensor module 2340 may measure a physical quantity or detect a motion state of the electronic device 2301, and the sensor module 240 may convert the measured or detected information into an electrical signal. The sensor module 2340 may include, e.g., a gesture sensor 2340A, a gyro sensor 2340B, an atmospheric pressure sensor 2340C, a magnetic sensor 2340D, an acceleration sensor 2340E, a grip sensor 2340F, a proximity sensor 2340G, a color sensor 2340H such as a red-green-blue (RGB) sensor, a bio sensor 2340I, a temperature/humidity sensor 2340J, an illumination sensor 2340K, or an ultra violet (UV) sensor 2340M. Additionally or alternatively, the sensing module 2340 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 2340 may further include a control circuit for controlling at least one or more of the sensors included in the sensing module. According to an embodiment of the present disclosure, the electronic device 2301 may further include a processor configured to control the sensor module 2340 as part of the processor 2310 or separately from the processor 2310, and the electronic device 2701 may control the sensor module 2340 while the processor 210 is in a sleep mode.

The input unit 2350 may include, e.g., a touch panel 2352, a (digital) pen sensor 2354, a key 2356, or an ultrasonic input device 2358. The touch panel 2352 may use at least one of capacitive, resistive, infrared, or ultrasonic methods. The touch panel 2352 may further include a control circuit. The touch panel 2352 may further include a tactile layer and may provide a user with a tactile reaction.

The (digital) pen sensor 2354 may include, e.g., a part of a touch panel or a separate sheet for recognition. The key 2356 may include e.g., a physical button, optical key or key pad. The ultrasonic input device 2358 may sense an ultrasonic wave generated from an input tool through a microphone (e.g., the microphone 2388) to identify data corresponding to the sensed ultrasonic wave.

The display 2360 (e.g., the display 160) may include a panel 2362, a hologram device 2364, or a projector 2366. The panel 2362 may have the same or similar configuration to the display 160 of FIG. 1. The panel 2362 may be implemented to be flexible, transparent, or wearable. The panel 2362 may also be incorporated with the touch panel 2352 in a module. The hologram device 2364 may make 3D images (holograms) in the air by using light interference. The projector 2366 may display an image by projecting light onto a screen. The screen may be, for example, located inside or outside of the electronic device 2301. In accordance with an embodiment, the display 2360 may further include a control circuit to control the panel 2362, the hologram device 2364, or the projector 2366.

The interface 2370 may include e.g., a HDMI 2372, a USB 2374, an optical interface 2376, or a D-subminiature (D-sub) 2378. The interface 2370 may be included in e.g., the communication interface 170 shown in FIG. 1. Additionally or alternatively, the interface 2370 may include a mobile high-definition link (MHL) interface, a SD card/MMC interface, or infrared data association (IrDA) standard interface.

The audio processing unit 2380 may convert a sound into an electric signal or vice versa, for example. At least a part of the audio processing unit 2380 may be included in e.g., the input/output interface 150 as shown in FIG. 1. The audio processing unit 2380 may process sound information input or output through e.g., a speaker 2382, a receiver 2384, an earphone 2386, or a microphone 2388.

For example, the camera module 2391 may be a device for recording still images and videos, and may include, according to an embodiment of the present disclosure, one or more image sensors (e.g., front and back sensors), a lens, an Image signal processor (ISP), or a flash such as an LED or xenon lamp.

The power manager module 2395 may manage power of the electronic device 2301, for example. According to an embodiment of the present disclosure, the power manager module 2495 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 2396, a voltage, a current, or a temperature while the battery 296 is being charged. The battery 2396 may include, e.g., a rechargeable battery or a solar battery.

The indicator 2397 may indicate a particular state of the electronic device 2301 or a part (e.g., the processor 2310) of the electronic device, including e.g., a booting state, a message state, or recharging state. The motor 2398 may convert an electric signal to a mechanical vibration and may generate a vibrational or haptic effect. Although not shown, a processing unit for supporting mobile TV, such as a GPU may be included in the electronic device 2301. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 24:
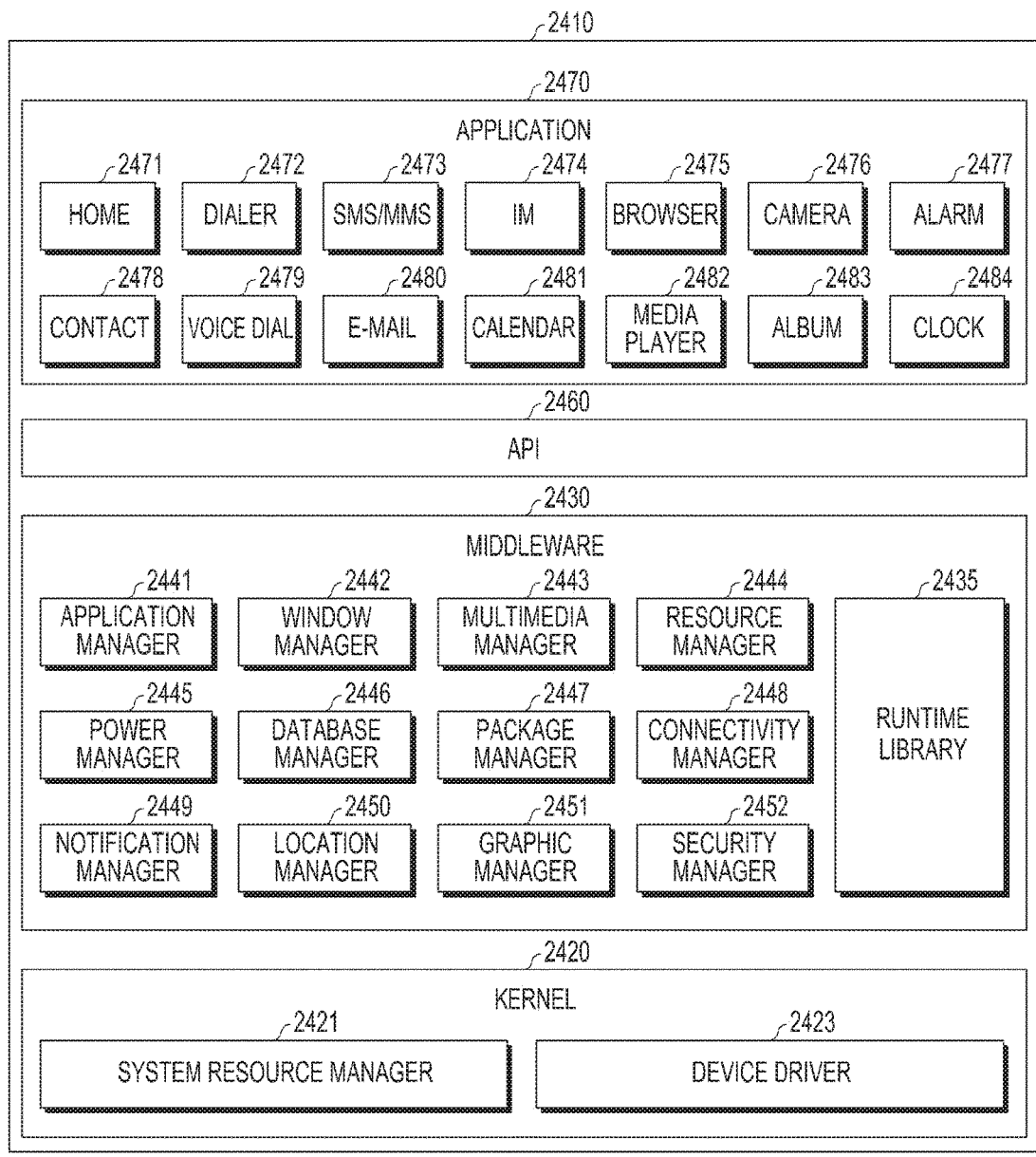
FIG. 24 is a block diagram illustrating a program module according to various embodiments of the present disclosure.

FIG. 24 is a block diagram illustrating a program module according to an embodiment of the present disclosure.

According to an embodiment of the present disclosure, the program module 2410 (e.g., the program 140) may include an OS controlling resources related to the electronic device (e.g., the electronic device 101) and/or various applications (e.g., the AP 147) driven on the OS. The OS may include, e.g., Android, iOS, Windows, Symbian, Tizen, or Bada.

The program 2410 may include, e.g., a kernel 2420, middleware 2430, an API 2460, and/or an application 2470. At least a part of the program module 2410 may be preloaded on the electronic device or may be downloaded from an external electronic device (e.g., the electronic devices 102 and 104 or server 106).

The kernel 2420 (e.g., the kernel 141) may include, e.g., a system resource manager 2421 and/or a device driver 2423. The system resource manager 2421 may perform control, allocation, or recovery of system resources. According to an embodiment of the present disclosure, the system resource manager 2421 may include a process managing unit, a memory managing unit, or a file system managing unit. The device driver 2423 may include, e.g., a display driver, a camera driver, a Bluetooth driver, a shared memory driver, a USB driver, a keypad driver, a Wi-Fi driver, an audio driver, or an inter-process communication (IPC) driver.

The middleware 2430 may provide various functions to the application 2470 through the API 2460 so that the application 2470 may efficiently use limited system resources in the electronic device or provide functions jointly required by applications 2470. According to an embodiment of the present disclosure, the middleware 2430 (e.g., the middleware 143) may include at least one of a runtime library 2435, an application manager 2441, a window manager 2442, a multimedia manager 2443, a resource manager 2444, a power manager 2445, a database manager 2446, a package manager 2447, a connectivity manager 2448, a notification manager 2449, a location manager 2450, a graphic manager 2451, or a security manager 2452.

The runtime library 2435 may include a library module used by a compiler in order to add a new function through a programming language while, e.g., the application 2470 is being executed. The runtime library 2435 may perform input/output management, memory management, or operation on arithmetic functions.

The application manager 2441 may manage the life cycle of at least one application of, e.g., the applications 2470. The window manager 2442 may manage graphical user interface (GUI) resources used on the screen. The multimedia manager 2443 may grasp formats necessary to play various media files and use a codec appropriate for a format to perform encoding or decoding on media files. The resource manager 2444 may manage resources, such as source code of at least one of the applications 2470, memory or storage space.

The power manager 2445 may operate together with, e.g., a basic input/output system (BIOS) to manage battery or power and provide power information necessary for operating the electronic device. The database manager 2446 may generate, search, or vary a database to be used in at least one of the applications 2470. The package manager 2447 may manage installation or update of an application that is distributed in the form of a package file.

The connectivity manager 2448 may manage wireless connectivity, such as, e.g., Wi-Fi or Bluetooth. The notification manager 2449 may display or notify an event, such as a coming message, appointment, or proximity notification, of the user without interfering with the user. The location manager 2450 may manage locational information on the electronic device. The graphic manager 2451 may manage graphic effects to be offered to the user and their related user interface. The security manager 2452 may provide various security functions necessary for system security or user authentication. According to an embodiment of the present disclosure, when the electronic device (e.g., the electronic device 101) has telephony capability, the middleware 2430 may further include a telephony manager for managing voice call or video call functions of the electronic device.

The middleware 2430 may include a middleware module forming a combination of various functions of the above-described components. The middleware 2430 may provide a specified module per type of the OS in order to provide a differentiated function. Further, the middleware 2430 may dynamically omit some existing components or add new components.

The API 2460 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 2470 (e.g., the AP 147) may include one or more applications that may provide functions such as, e.g., a home 2471, a dialer 2472, a short message service (SMS)/multimedia messaging service (MMS) 2473, an instant message (IM) 2474, a browser 2475, a camera 2476, an alarm 2477, a contact 2478, a voice dial 2479, an email 2480, a calendar 2481, a media player 2482, an album 2483, or a clock 2484, a health-care (e.g., measuring the degree of workout or blood sugar), or provision of environmental information (e.g., provision of air pressure, moisture, or temperature information).

According to an embodiment of the present disclosure, the application 2470 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 2470 may include an application (e.g., a health-care application of a mobile medical device) designated according to an attribute of the external electronic device (e.g., the electronic devices 102 and 104). According to an embodiment of the present disclosure, the application 2470 may include an application received from the external electronic device (e.g., the server 106 or electronic devices 102 and 104). According to an embodiment of the present disclosure, the application 2470 may include a preloaded application or a third party application downloadable from a server. The names of the components of the program module 2410 according to the shown embodiment may be varied depending on the type of OS.

According to an embodiment of the present disclosure, at least a part of the program module 2410 may be implemented in software, firmware, hardware, or in a combination of two or more thereof. At least a part of the programming module 2410 may be implemented (e.g., executed) by e.g., a processor (e.g., the processor 210). At least a part of the program module 2410 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a computer readable recording medium recording a program running on a computer, the program including executable commands executed by a processor to enable the processor to run an application, obtain information relating to a shape of the bend of a display and a form of a mount of the electronic device based on information sensed by at least one sensor, determine a transformation type of the display based on the information relating to the shape of the bend and the form of the mount, when the electronic device is mounted in the determined transformation type, determine a display area in the display according to a first function of the application corresponding to the transformation type of the display, and display an object relating to the first function on the determined display area.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a display positioned on at least a surface of a housing of the electronic device;
   at least one sensor;
   a memory configured to store instructions; and
   at least one processor configured to execute the instructions to:
     set a plurality of transformation types of the display based on a bent shape of the display and a mounting form of the electronic device,
     in response to identifying that the display is bent, identify a first bent shape based on first information related to the bent shape of the display obtained using the at least one sensor,
     in response to identifying that the electronic device is mounted and the display is bent, identify a first mounting form based on second information related to the mounting form of the electronic device obtained using the at least one sensor,
     identify a first transformation type from among the plurality of transformation types based on the first bent shape and the first mounting form,
     control the display to display at least one object related to a first function of an application on at least one display area from among display areas of the display divided according to the first transformation type,
     in response to identifying that the mounting form of the electronic device is changed while the display is bent, identify a second mounting form based on the second information obtained using the at least one sensor,
     identify a second transformation type from among the plurality of transformation types based on the second mounting form, and
     control the display to display the at least one object on at least one display area from among display areas of the display divided according to the second transformation type.

2. The electronic device of claim 1, wherein, when no input information is received by a user or the electronic device does not move during a preset time, the at least one processor is further configured to identify that the electronic device is in a state of being mounted in the first transformation type.

3. The electronic device of claim 1, wherein the at least one processor is further configured to:
   detect feature information for the first transformation type, and
   identify the first function of the application based on the detected feature information.

4. The electronic device of claim 1, wherein the at least one processor is further configured to:
   identify a main display area among the display areas divided according to the first transformation type, and
   display the at least one object related to the first function on the identified main display area.

5. The electronic device of claim 1, wherein the first information related to the bent shape of the display includes at least one of a direction, a rotation angle, a resistance of the bend of the display, or an inter-gravity sensor distance.

6. The electronic device of claim 1, wherein the second information related to the mounting form includes at least one of information received from the at least one sensor configured to sense whether there is a contact to a floor or information obtained by sensing a user's view received from a camera.

7. The electronic device of claim 1, wherein, when an event for another application occurs while the first function of the application runs with the electronic device mounted in the first transformation type, the at least one processor is further configured to control the display to display at least one object for a function of the other application on the at least one display area of the first transformation type.

8. The electronic device of claim 1, wherein, when the display is configured to transform from the first transformation type to the second transformation type, the at least one processor is further configured to:
   display at least one object for a second function of the application on the at least one display area of the second transformation type while keeping running the application.

9. The electronic device of claim 8, wherein the display area of the second transformation type is different from the display area displaying the at least one object for the first function in the first transformation type.

10. A method for running a function on an electronic device, the method comprising:
    setting a plurality of transformation types of a display of the electronic device based on a bent shape the display and a mounting form of the electronic device;
    in response to identifying that the display is bent, identifying a first bent shape based on first information related to the bent shape of the display obtained using at least one sensor of the electronic device;
    in response to identifying that the electronic device is mounted and the display is bent, identifying a first mounting form based on second information related to the mounting form of the electronic device obtained using the at least one sensor;
    identifying a first transformation type from among the plurality of transformation types based on the first bent shape and the first mounting form;
    controlling the display to display at least one object related to a first function of an application on at least one display area from among display areas of the display divided according to the first transformation type;
    in response to identifying that the mounting form of the electronic device is changed while the display is bent, identifying a second mounting form based on the second information obtained using the at least one sensor;
    identifying a second transformation type from among the plurality of transformation types based on the second mounting form; and
    controlling the display to display the at least one object on at least one display area from among display areas of the display divided according to the second transformation type.

11. The method of claim 10, further comprising:
    identifying whether input information is received by a user or the electronic device moves during a preset time; and when the input information is not received or the electronic device does not move, identifying that the electronic device is mounted in the first transformation type.

12. The method of claim 10, wherein the identifying of the first function comprises:
  detecting feature information for the first transformation type; and
  identifying the first function of the application based on the detected feature information.

13. The method of claim 10, wherein the controlling of the display to display at least one the object related to the first function comprises:
  when the electronic device is identified to be mounted in the first transformation type during a preset time, running the first function; and
  displaying the at least one object related to the first function on the at least one display area of the first transformation type.

14. The method of claim 10,
  wherein the first information related to the bent shape of the display includes at least one of a direction, rotation angle, resistance of the bend of the display, or an inter-gravity sensor distance, and
  wherein the second information related to the mounting form includes at least one of information received from the at least one sensor configured to sense whether there is a contact to a floor or information obtained by sensing a user's view received from a camera.

15. The method of claim 10, further comprising, when an event for another application occurs while the application runs in the electronic device mounted in the first transformation type, displaying an object for a function of the other application on the at least one display area of the first transformation type.

16. The method of claim 15, wherein the displaying of the object for the other application comprises:
  when the display transforms from the first transformation type to the second transformation type, displaying at least one object for a second function of the application on the at least one display area of the second transformation type while keeping the application running.

17. The method of claim 16, wherein the display area of the second transformation type is different from the display area displaying the at least one object for the first function of the application in the first transformation type.

18. A non-transitory computer readable storage medium configured to store one or more computer programs including instructions that, when executed by at least one processor cause the at least one processor to control for:
  setting a plurality of transformation types of a display of an electronic device based on a shape of a bend of the display and a form of a mount of the electronic device;
  in response to identifying that the display is bent, identifying a first bent shape based on first information related to a shape of the bend of the display obtained using at least one sensor of the electronic device;
  in response to identifying that the electronic device is mounted and the display is bent, identifying a first mount form based on second information related to a form of a mount of the electronic device obtained using the at least one sensor;
  determining a first transformation type of the plurality of transformation types based on the first bent shape and the first mount form;
  controlling the display to display at least one object related to a first function of an application on at least one display area among display areas of the display divided corresponding to the first transformation type;
  in response to identifying that the form of the mount of the electronic device is changed while the display is bent, identifying a second mount form based on the second information obtained using the at least one sensor;
  identifying a second transformation type of the plurality of transformation types based on the second mount form; and
  controlling the display to display the at least one object on at least one display area among display areas of the display divided corresponding to the second transformation type.

* * * * *